United States Patent
Hwang et al.

(10) Patent No.: US 10,965,430 B2
(45) Date of Patent: Mar. 30, 2021

(54) METHOD FOR TRANSMITTING HARQ ACK/NACK SIGNAL IN NB IOT

(71) Applicant: LG ELECTRONICS INC., Seoul (KR)

(72) Inventors: Seunggye Hwang, Seoul (KR); Joonkui Ahn, Seoul (KR); Suckchel Yang, Seoul (KR); Seonwook Kim, Seoul (KR); Changhwan Park, Seoul (KR); Daesung Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 26 days.

(21) Appl. No.: 16/347,177

(22) PCT Filed: Oct. 26, 2017

(86) PCT No.: PCT/KR2017/011874
§ 371 (c)(1),
(2) Date: May 2, 2019

(87) PCT Pub. No.: WO2018/084487
PCT Pub. Date: May 11, 2018

(65) Prior Publication Data
US 2019/0363857 A1    Nov. 28, 2019

Related U.S. Application Data

(60) Provisional application No. 62/457,160, filed on Feb. 10, 2017, provisional application No. 62/454,047, (Continued)

(51) Int. Cl.
*H04L 5/00* (2006.01)
*H04L 1/18* (2006.01)
(Continued)

(52) U.S. Cl.
CPC .......... *H04L 5/0055* (2013.01); *H04L 1/1812* (2013.01); *H04L 1/1896* (2013.01);
(Continued)

(58) Field of Classification Search
CPC ... H04L 5/0055; H04L 1/1812; H04L 1/1896; H04L 67/12
See application file for complete search history.

(56) References Cited

U.S. PATENT DOCUMENTS

2017/0265168 A1* 9/2017 Wang ...................... H04L 67/12
2018/0049229 A1* 2/2018 Dinan ................... H04L 1/1896
(Continued)

FOREIGN PATENT DOCUMENTS

KR     10-2011-0051156 A     5/2011

OTHER PUBLICATIONS

Huawei et al., "On 2 HARQ processes for enhancement of NB-IoT", R1-1608648, 3GPP TSG RAN WG1 Meeting #86bis, Lisbon, Portugal, Oct. 10-14, 2016, see sections 2-4.
(Continued)

*Primary Examiner* — Min Jung
(74) *Attorney, Agent, or Firm* — Dentons US LLP

(57) ABSTRACT

A disclosure of the present specification provides a method for transmitting a hybrid automatic repeat request (HARQ) ACK/NACK signal in a narrowband Internet of things (NB-IoT) communication. The method may comprise a step of modulating at least one of a first and a second HARQ ACK/NACK signal by two HARQ processes. The step of modulating may comprise a step of mapping at least one of the first and the second HARQ ACK/NACK signal onto a constellation having a quadrature phase shift keying (QPSK) form. The first HARQ ACK/NACK signal may be a signal generated by a first HARQ process for a first downlink data through a first narrowband physical downlink shared chan-
(Continued)

2 HARQ process for NPDSCH nel (NPDSCH). The second HARQ ACK/NACK signal may be a signal generated by a second HARQ process for a second downlink data through a second NPDSCH.

17 Claims, 27 Drawing Sheets

Related U.S. Application Data filed on Feb. 3, 2017, provisional application No. 62/424,366, filed on Nov. 18, 2016, provisional application No. 62/417,346, filed on Nov. 4, 2016.

(51) Int. Cl.
    H04L 27/36    (2006.01)
    H04L 29/08    (2006.01)
    H04W 72/14    (2009.01)

(52) U.S. Cl.
    CPC ............ *H04L 27/361* (2013.01); *H04L 67/12* (2013.01); *H04W 72/14* (2013.01)

(56) References Cited

U.S. PATENT DOCUMENTS

| | | | |
|---|---|---|---|
| 2018/0092122 A1* | 3/2018 | Babaei | H04W 72/14 |
| 2018/0316464 A1* | 11/2018 | Stern-Berkowitz | H04L 1/1657 |
| 2018/0367278 A1* | 12/2018 | Chatterjee | H04L 5/0091 |
| 2019/0058552 A1* | 2/2019 | Yang | H04B 10/5561 |
| 2019/0260521 A1* | 8/2019 | Luo | H04L 1/1825 |

OTHER PUBLICATIONS

Nokia et al. "Supporting 2 HARQ processes for NB-IoT", R1-1608888, 3GPP TSG-RAN WG1 Meeting #86bis, Lisbon, Portugal, Oct. 10-14, 2016, see section 2, figure 4.

Huawei et al., "Asynchronous HARQ procedure in NR", R2-166220, 3GPP TSG-RAN WG2 Meeting #95bis, Kaohsiung, Oct. 10-14, 2016, see section 2, figure 1.

Huawei et al., "Support 2 HARQ Processes in NB-IoT", R2-166327, 3GPP TSG-RAN WG2 Meeting #95bis, Kaohsiung, Oct. 10-14, 2016, see section 2, figures 1-4.

* cited by examiner

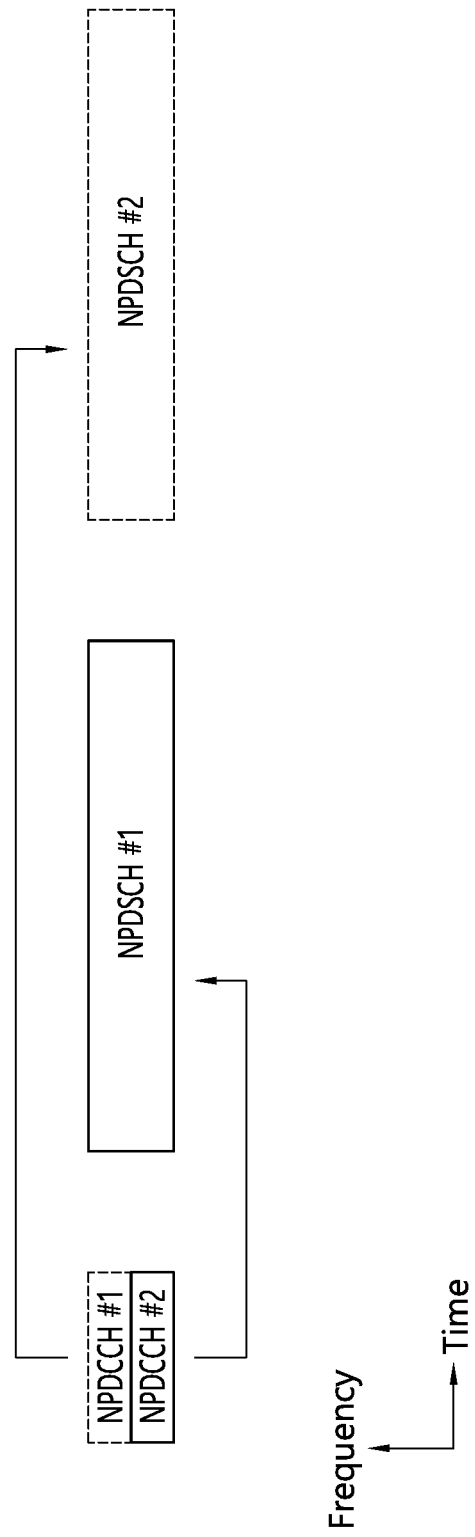

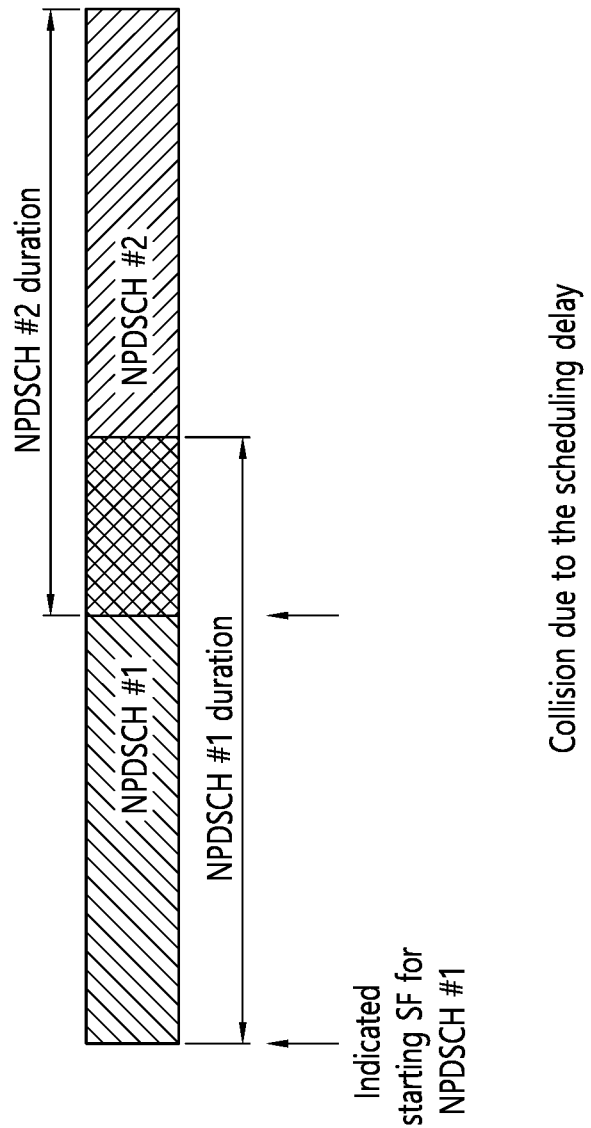

FIG. 13A

| $N_{SF}$ \ $N_{Rep}$ | 1 | 2 | 4 | 8 | 16 | 32 | 64 | 128 | 192 | 256 | 384 | 512 | 768 | 1024 | 1536 | 2048 |
|---|---|---|---|---|---|---|---|---|---|---|---|---|---|---|---|---|
| 1 | 1 | 2 | 4 | 8 | 16 | 32 | 64 | 128 | 192 | 256 | 384 | 512 | 768 | 1024 | 1536 | 2048 |
| 2 | 2 | 4 | 8 | 16 | 32 | 64 | 128 | 256 | 384 | 512 | 768 | | | | | |
| 3 | 3 | 6 | 12 | 24 | 48 | 96 | 192 | 384 | 576 | 768 | | | | | | |
| 4 | 4 | 8 | 16 | 32 | 64 | 128 | 256 | 512 | 768 | | | | | | | |
| 5 | 5 | 10 | 20 | 40 | 80 | 160 | 320 | 640 | 960 | | | | | | | |
| 6 | 6 | 12 | 24 | 48 | 96 | 192 | 384 | 768 | | | | | | | | |
| 8 | 8 | 16 | 32 | 64 | 128 | 256 | 512 | | | | | | | | | |
| 10 | 10 | 20 | 40 | 80 | 160 | 320 | 640 | | | | | | | | | |

Possible combination of $N_{Rep}$ and $N_{SF}$ for all Rmax values

FIG. 13B

| $N_{SF}$ \ $N_{Rep}$ | 1 | 2 | 4 | 8 | 16 | 32 | 64 | 128 | 192 | 256 | 384 | 512 | 768 | 1024 | 1536 | 2048 |
|---|---|---|---|---|---|---|---|---|---|---|---|---|---|---|---|---|
| 1 | 1 | 2 | 4 | 8 | 16 | 32 | 64 | | | | | | | | | |
| 2 | 2 | 4 | 8 | 16 | 32 | 64 | | | | | | | | | | |
| 3 | 3 | 6 | 12 | 24 | 48 | 96 | | | | | | | | | | |
| 4 | 4 | 8 | 16 | 32 | 64 | | | | | | | | | | | |
| 5 | 5 | 10 | 20 | 40 | 80 | | | | | | | | | | | |
| 6 | 6 | 12 | 24 | 48 | 96 | | | | | | | | | | | |
| 8 | 8 | 16 | 32 | 64 | | | | | | | | | | | | |
| 10 | 10 | 20 | 40 | 80 | | | | | | | | | | | | |

Possible combination-1 of $N_{Rep}$ and $N_{SF}$ for all Rmax < 128

FIG. 13C

| $N_{SF}$ \ $N_{Rep}$ | 1 | 2 | 4 | 8 |
|---|---|---|---|---|
| 1 | 1 | 2 | 4 | 8 |
| 2 | 2 | 4 | 8 | 16 |
| 3 | 3 | 6 | 12 | 24 |
| 4 | 4 | 8 | 16 | 32 |
| 5 | 5 | 10 | 20 | 40 |
| 6 | 6 | 12 | 24 | 48 |
| 8 | 8 | 16 | 32 | 64 |
| 10 | 10 | 20 | 40 | 80 |

Possible combination-1 of $N_{Rep}$ and $N_{SF}$ for all Rmax < 128

FIG. 14A

| $N_{SF}$ \ $N_{Rep}$ | 1 | 2 | 4 | 8 | 16 | 32 | 64 | 128 |
|---|---|---|---|---|---|---|---|---|
| 1 | 16 | 32 | | | | | | |
| 2 | 32 | | | | | | | |
| 3 | 48 | | | | | | | |
| 4 | | | | | | | | |
| 5 | | | | | | | | |
| 6 | | | | | | | | |
| 8 | | | | | | | | |
| 10 | | | | | | | | |

Possible combination of $\Delta f = 15\text{kHz}$, $N^{UL}_{slots} = 16$

FIG. 14B

| $N_{SF}$ \ $N_{Rep}$ | 1 | 2 | 4 | 8 | 16 | 32 | 64 | 128 |
|---|---|---|---|---|---|---|---|---|
| 1 | 8 | 16 | 32 | | | | | |
| 2 | 16 | 32 | | | | | | |
| 3 | 24 | 48 | | | | | | |
| 4 | 32 | | | | | | | |
| 5 | 40 | | | | | | | |
| 6 | 48 | | | | | | | |
| 8 | | | | | | | | |
| 10 | | | | | | | | |

Possible combination of $\Delta f=15kHz$, $N^{UL}_{slots}=8$

FIG. 14C

| $N_{SF}$ \ $N_{Rep}$ | 1 | 2 | 4 | 8 | 16 | 32 | 64 | 128 |
|---|---|---|---|---|---|---|---|---|
| 1 | 4 | 8 | 16 | 32 | | | | |
| 2 | 8 | 16 | 32 | | | | | |
| 3 | 12 | 24 | 48 | | | | | |
| 4 | 16 | 32 | | | | | | |
| 5 | 20 | 40 | | | | | | |
| 6 | 24 | 48 | | | | | | |
| 8 | 32 | | | | | | | |
| 10 | 40 | | | | | | | |

Possible combination of $\Delta f = 15 kHz$, $N^{UL}_{slots} = 4$

FIG. 14D

| $N_{SF}$ \ $N_{Rep}$ | 1 | 2 | 4 | 8 | 16 | 32 | 64 | 128 |
|---|---|---|---|---|---|---|---|---|
| 1 | 2 | 4 | 8 | 16 | 32 | | | |
| 2 | 4 | 8 | 16 | 32 | | | | |
| 3 | 6 | 12 | 24 | 48 | | | | |
| 4 | 8 | 16 | 32 | | | | | |
| 5 | 10 | 20 | 40 | | | | | |
| 6 | 12 | 24 | 48 | | | | | |
| 8 | 16 | 32 | | | | | | |
| 10 | 20 | 40 | | | | | | |

Possible combination of $\Delta f = 15\text{kHz}$, $N^{UL}_{slots} = 2$

US 10,965,430 B2

METHOD FOR TRANSMITTING HARQ ACK/NACK SIGNAL IN NB IOT

CROSS-REFERENCE TO RELATED APPLICATIONS

This application is the National Stage filing under 35 U.S.C. 371 of International Application No. PCT/KR2017/011874, filed on Oct. 26, 2017, which claims the benefit of U.S. Provisional Applications No. 62/417,346 filed on Nov. 4, 2016, No. 62/424,366 filed on Nov. 18, 2016, No. 62/454,047 filed on Feb. 3, 2017, and No. 62/457,160 filed on Feb. 10, 2017, the contents of which are all hereby incorporated by reference herein in their entirety.

BACKGROUND OF THE INVENTION

Field of the Invention

The present invention relates to mobile communication.

Related Art

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

As disclosed in 3GPP TS 36.211 V10.4.0 (2011-12) "Evolved Universal Terrestrial Radio Access (E-UTRA); Physical Channels and Modulation (Release 10)", a physical channel of LTE may be classified into a downlink channel, i.e., a PDSCH (Physical Downlink Shared Channel) and a PDCCH (Physical Downlink Control Channel), and an uplink channel, i.e., a PUSCH (Physical Uplink Shared Channel) and a PUCCH (Physical Uplink Control Channel).

Meanwhile recently, Internet of Things (IoT) communication has been attracted. The IoT refers to communications that do not involve human interaction. A discussion is beginning to be made to accommodate such IoT communications in a cellular-based LTE system.

One way to reduce the cost of IoT devices is to reduce the bandwidth used. The IoT communication operating on the reduced bandwidth may be called Narrow Band (NB) IoT communication or NB CIoT communication.

The conventional Hybrid Automatic Repeat reQuest (HARQ) operation may be inefficient for the NB-IoT communication mentioned above.

SUMMARY OF THE INVENTION

Accordingly, a disclosure of the present specification has been made in an effort to solve the aforementioned problem.

To achieve the object described above, a disclosure of the present specification provides a method for transmitting an HARQ ACK/NACK signal for Narrowband Internet of Things (NB-IoT) communication. The method may comprise performing modulation of one or more of a first and second HARQ ACK/NACK signals generated by two HARQ processes. The performing modulation may comprise mapping one or more of the first and second HARQ ACK/NACK signals to a constellation in the form of Quadrature Phase Shift Keying (QPSK). The first HARQ ACK/NACK signal may be a signal generated by a first HARQ process with respect to first downlink data through a first Narrowband Physical Downlink Shared Channel (NPDSCH). The second HARQ ACK/NACK signal may be a signal generated by a second HARQ process with respect to second downlink data through a second NPDSCH.

The mapping to the QPSK constellation may be performed so that both of the I and Q signal change their sign when a value indicated by the second HARQ ACK/NACK signal is changed, and only one of the I or Q signal changes its sign when a value indicated by the first HARQ ACK/NACK signal is changed.

The first NPDSCH is scheduled by a first Narrowband Physical Downlink Control Channel (NPDCCH), and the second NPDSCH may be scheduled by a second NPDCCH.

A subframe in which the first NPDSCH is received is separated by a first offset (k1) from a subframe in which receiving of the first NPDSCCH is terminated, and a subframe in which the second NPDSCH is received is separated by a second offset (k2) from a subframe in which receiving of the second NPDCCH is terminated.

After the first and second NPDCCHs are received, the first and second NPDSCHs may be received.

The first offset (k1) and the second offset (k2) may be configured so that the subframe in which the first NPDCCH is received does not overlap the subframe in which the second NPDCCH is received.

If it is determined by checking the first offset (k1) and the second offset (k2) that the subframe in which the first NPDCCH is received overlaps the subframe in which the second NPDCCH is received, the method may further comprise assuming that the second NPDSCH is received at the time determined by adding an additional offset ($k_{offset}$) to the second offset (k2).

The additional offset may be determined through higher layer signaling.

The performing modulation may further comprise mapping the second HARQ ACK/NACK signal to a constellation in the form of Binary Phase Shift Keying (BPSK); and performing phase rotation according to the first HARQ ACK/NACK signal.

When it fails to decode second downlink data, mapping to the QPSK constellation may be performed so that the sign of Q of the QPSK constellation is changed according to a value of the first ACK/NACK signal with respect to the first downlink.

The sign of I of the QPSK constellation may also be changed according to a value of the first ACK/NACK signal with respect to the first downlink.

To achieve the object above, a disclosure of the present specification provides a Narrowband Internet of Things (NB-IoT) device which transmits a Hybrid Automatic Repeat reQuest (HARQ) ACK/NACK signal. The NB IoT device may comprise a transceiver; and a processor performing modulation of one or more of a first and second HARQ ACK/NACK signals generated by two HARQ processes. The modulation may comprise mapping one or more of the first and second HARQ ACK/NACK signals to a constellation in the form of Quadrature Phase Shift Keying (QPSK). The first HARQ ACK/NACK signal may be a signal generated by a first HARQ process with respect to first downlink data through a first Narrowband Physical Downlink Shared Channel (NPDSCH), and the second HARQ ACK/NACK signal may be a signal generated by a second HARQ process with respect to second downlink data through a second NPDSCH.

According to the disclosure of the present invention, the problem of the conventional technology described above may be solved.

BRIEF DESCRIPTION OF THE DRAWINGS

FIGS. 11a and 11b illustrate an example in which two HARQ processes are used for NPDSCHs.

FIG. 12a illustrates an example in which two NPDSCHs collide with each other.

FIGS. 13a to 13c illustrate examples of combinations of the number of repetitions ($N_{Rep}$) and the number of sub-frames ($N_{SF}$) by which two HARQ processes may be supported without involving collision among NPDSCHs in the form of tables.

FIGS. 14a to 14d illustrate examples of combinations of the number of repetitions ($N_{Rep}$) and the number of resource units ($N_{RU}$) by which two HARQ processes may be supported without involving collision among NPUSCHs in the form of tables according to the respective slot values ($N_{slot}^{UL}$).

DESCRIPTION OF EXEMPLARY EMBODIMENTS

Figure 1:
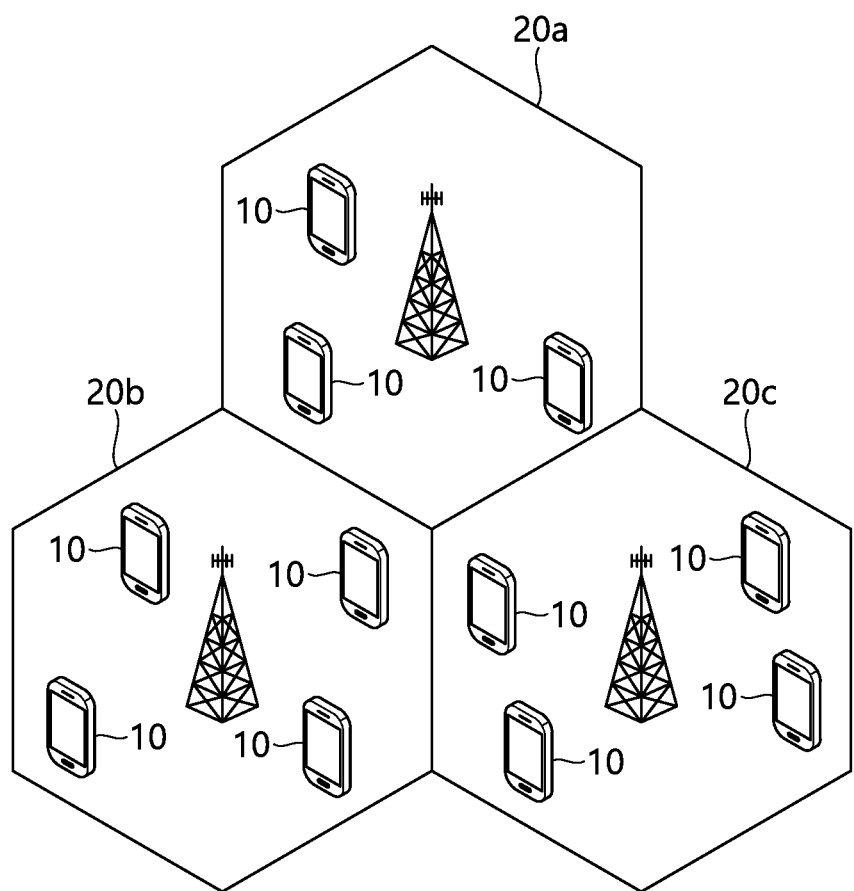
FIG. 1 is a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
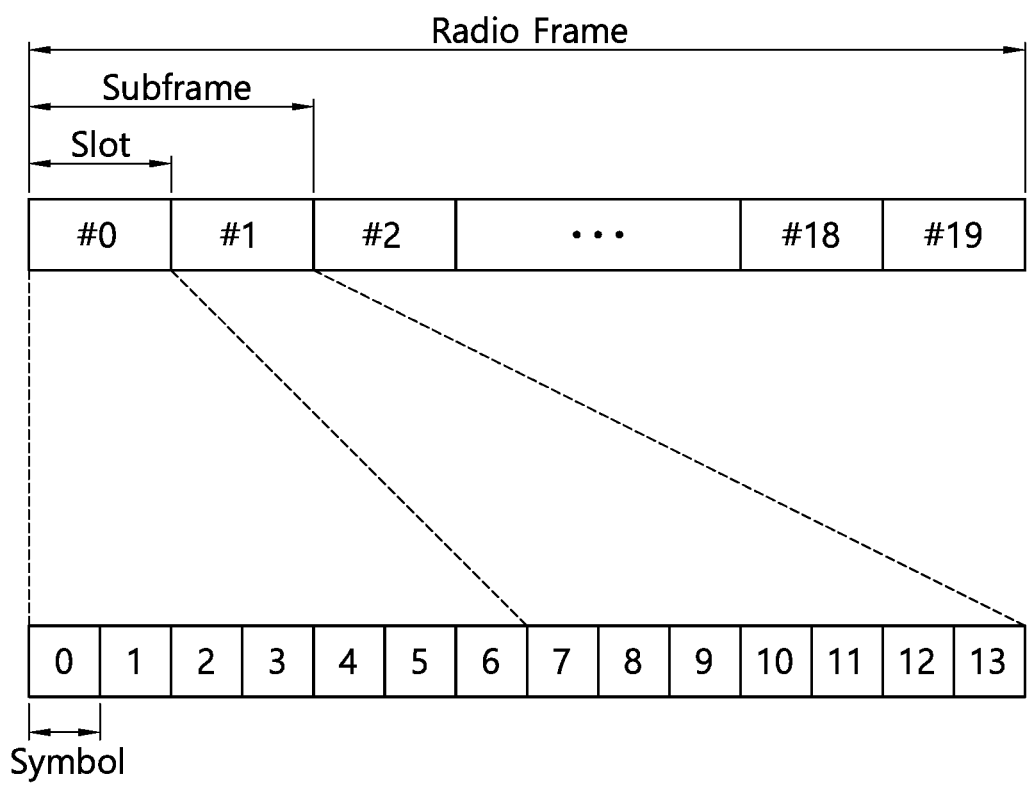
FIG. 2 illustrates a structure of a radio frame according to FDD in 3GPP LTE.

FIG. 2 shows a downlink radio frame structure according to 1-DD of 3rd generation partnership project (3GPP) long term evolution (LTE).

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

Meanwhile, one slot may include a plurality of OFDM symbols. The number of OFDM symbols included in one slot may vary depending on a cyclic prefix (CP).

One slot includes NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The uplink channels include a PUSCH, a PUCCH, an SRS (Sounding Reference Signal), and a PRACH (physical random access channel).

Figure 3:
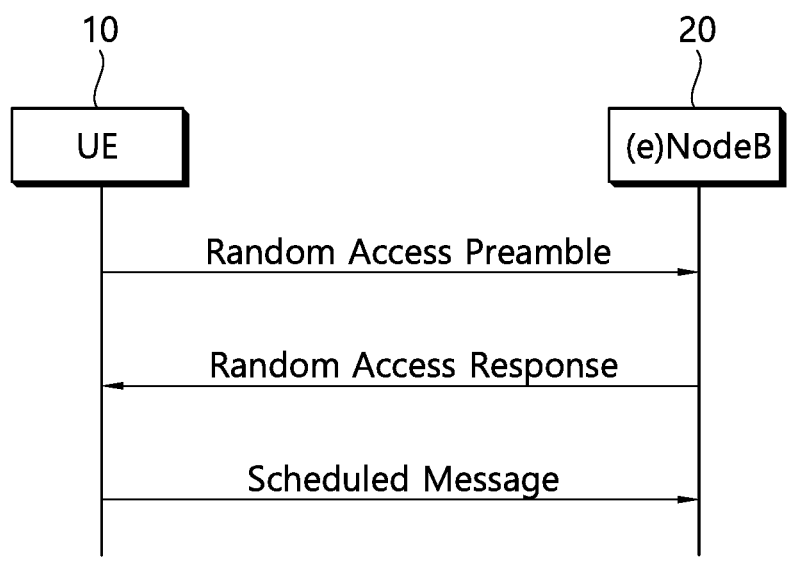
FIG. 3 is a flowchart illustrating a random access procedure in 3GPP LTE.

FIG. 3 is a flowchart illustrating a random access process in 3GPP LTE.

The random access process is used for UE 10 to obtain UL synchronization with a base station, that is, an eNodeB 20, or to be assigned UL radio resources.

The UE 10 receives a root index and a physical random access channel (PRACH) configuration index from the eNodeB 20. 64 candidate random access preambles defined by a Zadoff-Chu (ZC) sequence are present in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE 10 sends a randomly selected random access preamble to the eNodeB 20. Here, the UE 10 selects one of the 64 candidate random access preambles. Furthermore, the UE selects a subframe corresponding to the PRACH configuration index. The UE 10 sends the selected random access preamble in the selected subframe.

The eNodeB 20 that has received the random access preamble sends a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

<Carrier Aggregation>

A carrier aggregation system is now described.

A carrier aggregation system aggregates a plurality of component carriers (CCs). A meaning of an existing cell is changed according to the above carrier aggregation. According to the carrier aggregation, a cell may signify a combination of a downlink component carrier and an uplink component carrier or an independent downlink component carrier.

Further, the cell in the carrier aggregation may be classified into a primary cell, a secondary cell, and a serving cell. The primary cell signifies a cell operated in a primary frequency. The primary cell signifies a cell which UE performs an initial connection establishment procedure or a connection reestablishment procedure or a cell indicated as a primary cell in a handover procedure. The secondary cell signifies a cell operating in a secondary frequency. Once the RRC connection is established, the secondary cell is used to provide an additional radio resource.

As described above, the carrier aggregation system may support a plurality of component carriers (CCs), that is, a plurality of serving cells unlike a single carrier system.

The carrier aggregation system may support a cross-carrier scheduling. The cross-carrier scheduling is a scheduling method capable of performing resource allocation of a PDSCH transmitted through other component carrier through a PDCCH transmitted through a specific component carrier and/or resource allocation of a PUSCH transmitted through other component carrier different from a component carrier basically linked with the specific component carrier.

<Hybrid Automatic Repeat reQuest (HARQ)>

In what follows, HARQ in the 3GPP LTE/LTE-A will be described.

The 3GPP LTE uses synchronous HARQ for uplink transmission and asynchronous HARQ for downlink transmission. Synchronous HARQ refers to the case where re-transmission timing is fixed while asynchronous HARQ refers to the case where re-transmission timing is not fixed. In other words, synchronous HARQ performs the initial transmission and re-transmission at the HARQ period.

Figure 4:
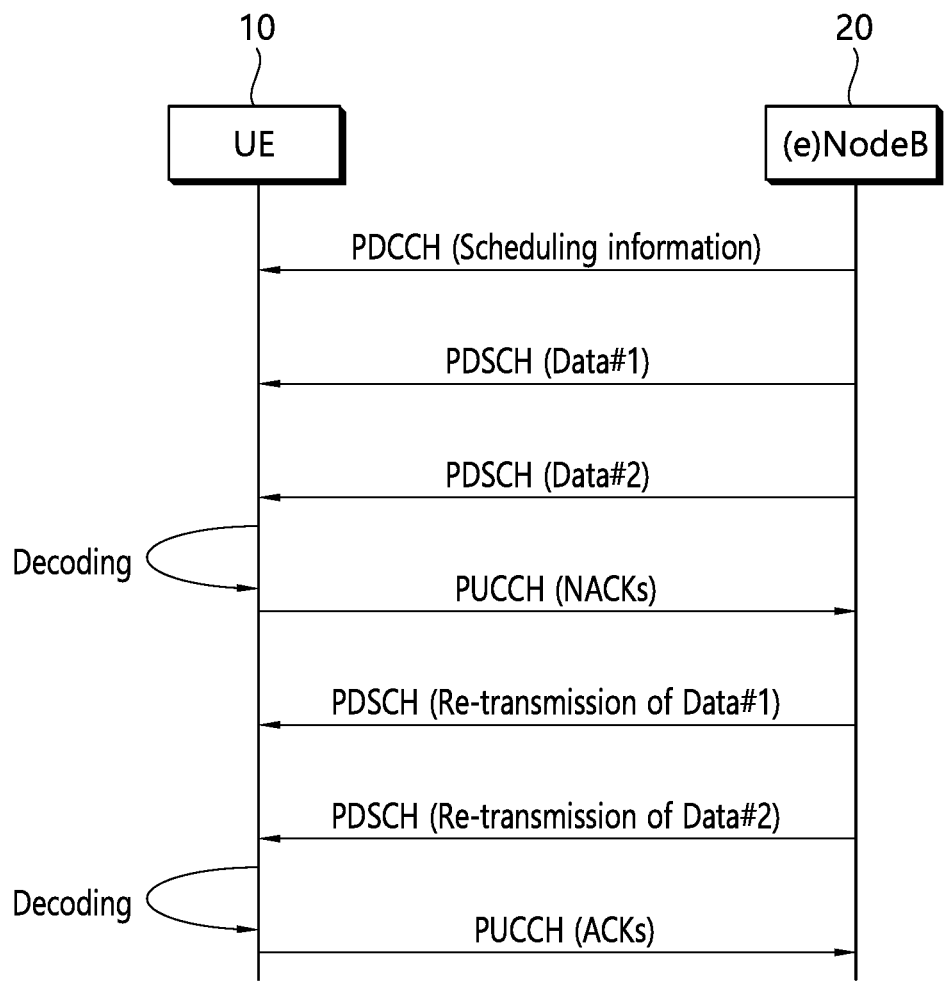
FIG. 4 illustrates an HARQ operation between a base station and a UE.

FIG. 4 illustrates an HARQ operation between a base station and a UE.

First, a base station transmits scheduling information through a Physical Downlink Control Channel (PDCCH) to transmit data to a UE according to the HARQ scheme.

The UE checks incoming scheduling information by monitoring the control channel, namely the PDCCH.

If it is found from the checking of the scheduling information that there exists information pertaining to the UE, the UE receives data (for example, data #1 and data #2 in the figure) from the base station through a common channel (Physical Shared Channel (PSCH)) at the time associated with the PDCCH.

Receiving the data, the UE attempts decoding of the data. According to the decoding result, the UE transmits HARQ feedback to the base station. In other words, if the decoding is successful, the UE transmits an ACK signal to the base station while, if the decoding fails, the UE transmits a NACK signal to the base station through a PUCCH or PUSCH.

Receiving the ACK signal, the base station recognizes that data transmission to the UE is successful and transmits the next data.

However, if the base station receives a NACK signal, the base station detects that data transmission to the UE has failed and retransmits the same data at an appropriate time in the same or new format.

The UE, which has transmitted the NACK signal, attempts to receive retransmitted data.

If the UE receives the retransmitted data, the UE again attempts decoding by combining the received retransmitted data in various ways with the data stored in a buffer in the condition as when the decoding has failed and transmits an ACK signal when decoding is successful but a NACK signal when decoding fails to the base station through a PUCCH or PUSCH. The UE repeats transmitting a NACK signal and receiving re-transmitted data until it succeeds in data decoding.

<IoT (Internet of Things) Communication>

Hereinafter, the IoT will be described.

Figure 5A:
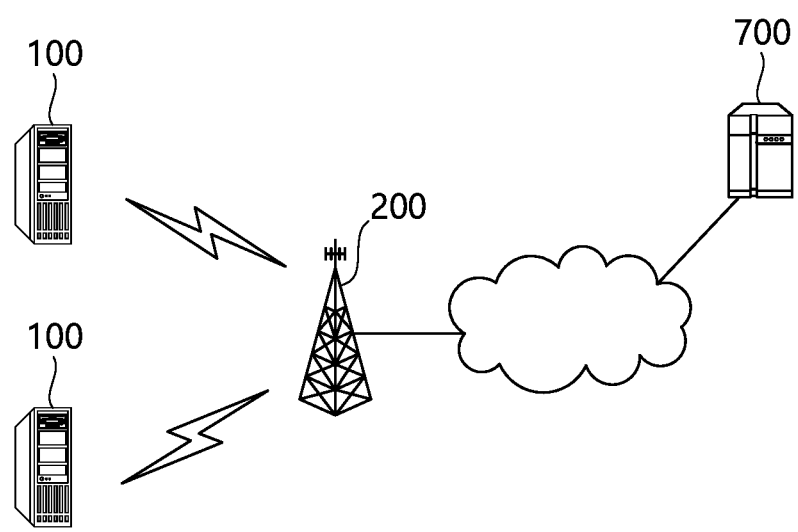
FIG. 5A illustrates an example of IoT (Internet of Things) communication.

FIG. 5A illustrates an example of IoT (Internet of Things) communication.

The IoT refers to information exchange between the IoT devices 100 without human interaction through the base station 200 or information exchange between the IoT device 100 and the server 700 through the base station 200. In this way, the IoT communication may be also referred to as Cellular Internet of Things (CIoT) in that it communicates with a cellular base station.

Such IoT communication is a type of MTC (machine type communication). Therefore, the IoT device may be referred to as an MTC device.

The IoT service is distinct from the service in the conventional human intervention communication and may include various categories of services such as tracking, metering, payment, medical service, and remote control. For example, the IoT services may include meter reading, water level measurement, use of surveillance cameras, inventory reporting of vending machines, and so on.

Since the IoT communication has a small amount of data to be transmitted and uplink or downlink data transmission and reception rarely occur, it is desirable to lower the cost of the IoT device 100 and reduce battery consumption depending on a low data rate. Further, since the IoT device 100 has low mobility characteristics, the IoT device 100 has characteristics that the channel environment changes little.

Figure 5B:
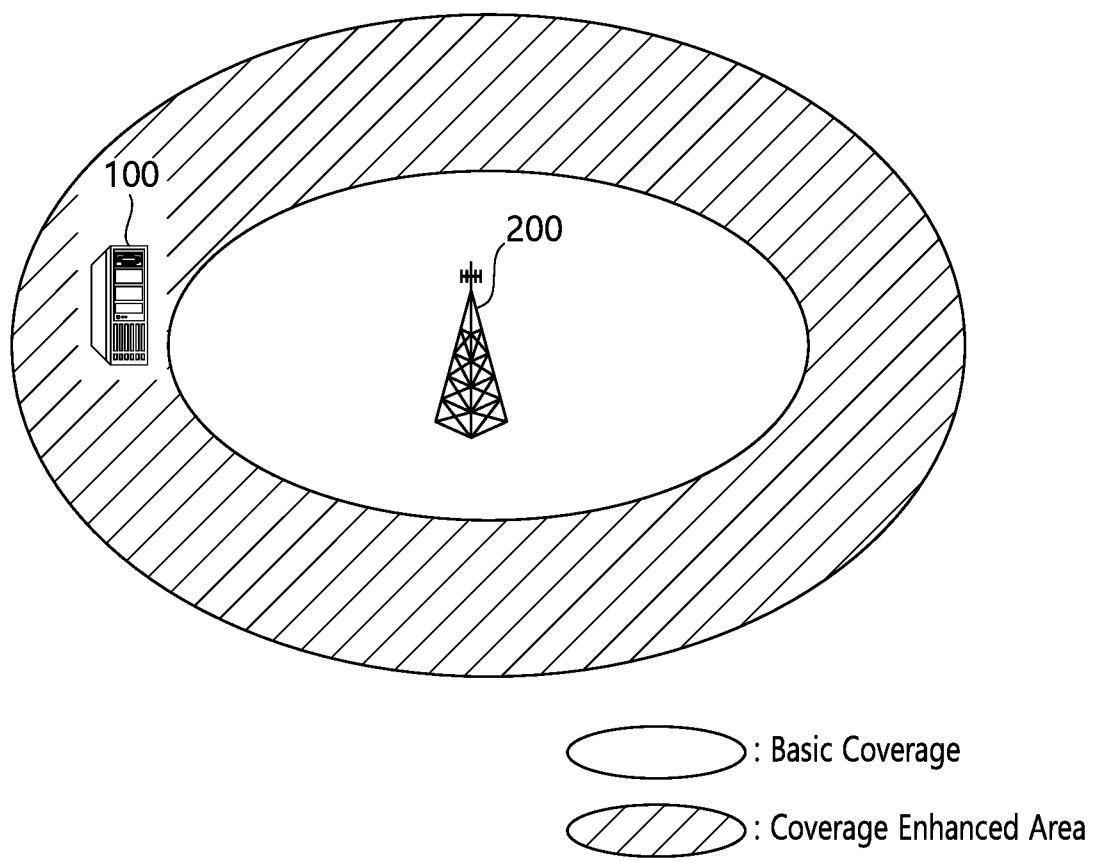
FIG. 5B is an illustration of cell coverage expansion or augmentation for an IoT device.

FIG. 5B is an illustration of cell coverage expansion or augmentation for an IoT device.

Recently, expanding or augmenting the cell coverage of the base station for the IoT device 100 has been considered, and various techniques for expanding or increasing the cell coverage have been discussed.

However, when the coverage of the cell is expanded or increased, if the base station transmits a downlink channel to the IoT device located in the coverage extension (CE) or coverage enhancement (CE) region, then the IoT device has difficulty in receiving it. Similarly, when an IoT device located in the CE region transmits an uplink channel, the base station has difficulty in receiving it.

In order to solve this problem, a downlink channel or an uplink channel may be repeatedly transmitted over multiple subframes. Repeating the uplink/downlink channels on multiple subframes is referred to as bundle transmission.

Then, the IoT device or the base station can increase the decoding success rate by receiving a bundle of downlink/uplink channels on multiple subframes, and decoding a part or all of bundles.

Figure 6A:
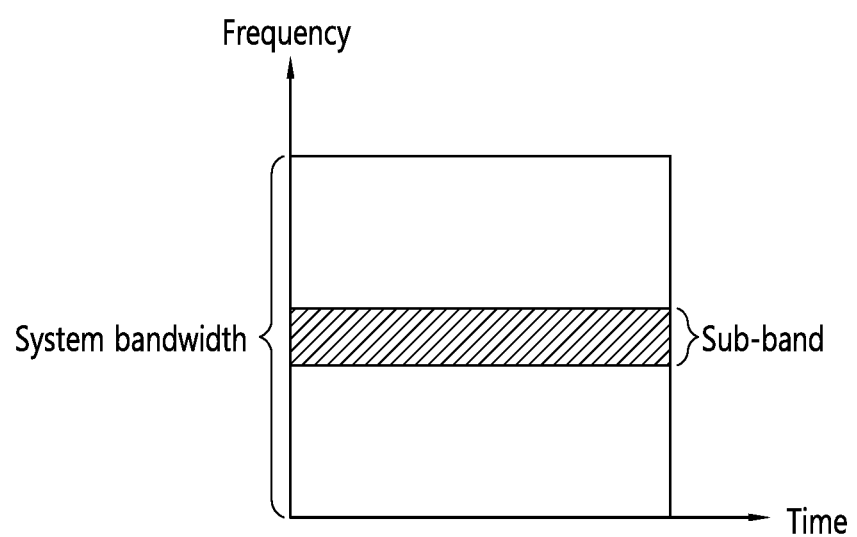
FIGS. 6A and 6B are diagrams illustrating examples of sub-bands in which IoT devices operate.
Figure 6B:
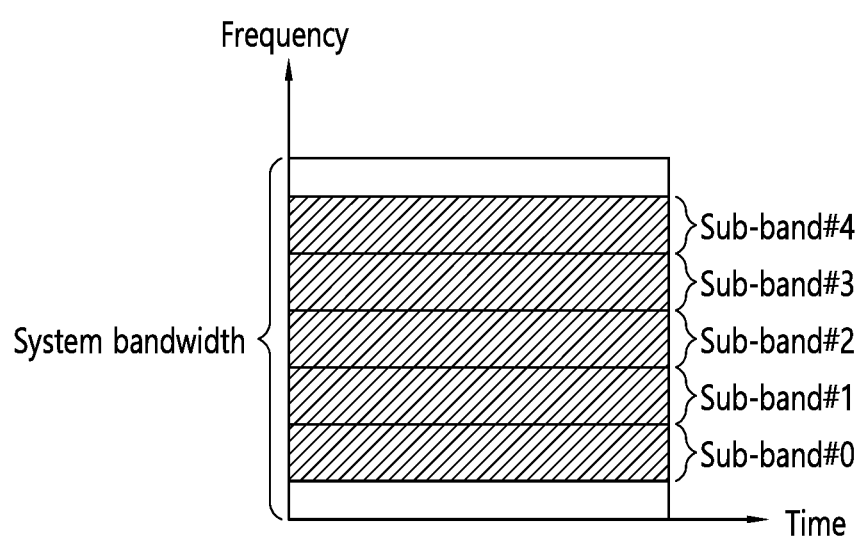

FIGS. 6A and 6B are diagrams illustrating examples of sub-bands in which IoT devices operate.

As one method for low-cost IoT devices, regardless of the system bandwidth of the cell as shown in FIG. 6A, the IoT device may use a sub-band of about 1.4 MHz for example.

In this case, an area of the subband in which the IoT device operates may be positioned in a central region (e.g., six middle PRBs) of the system bandwidth of the cell as shown in FIG. 6A.

Alternatively, as shown in FIG. 6B, a plurality of sub-bands of the IoT device may be used in one sub-frame for intra-subframe multiplexing between IoT devices to use different sub-bands between IoT devices. In this case, the majority of IoT devices may use sub-bands other than the central region of the system band of the cell (e.g., six middle PRBs).

The IoT communication operating on such a reduced bandwidth can be called NB (Narrow Band) IoT communication or NB CIoT communication.

Figure 7:
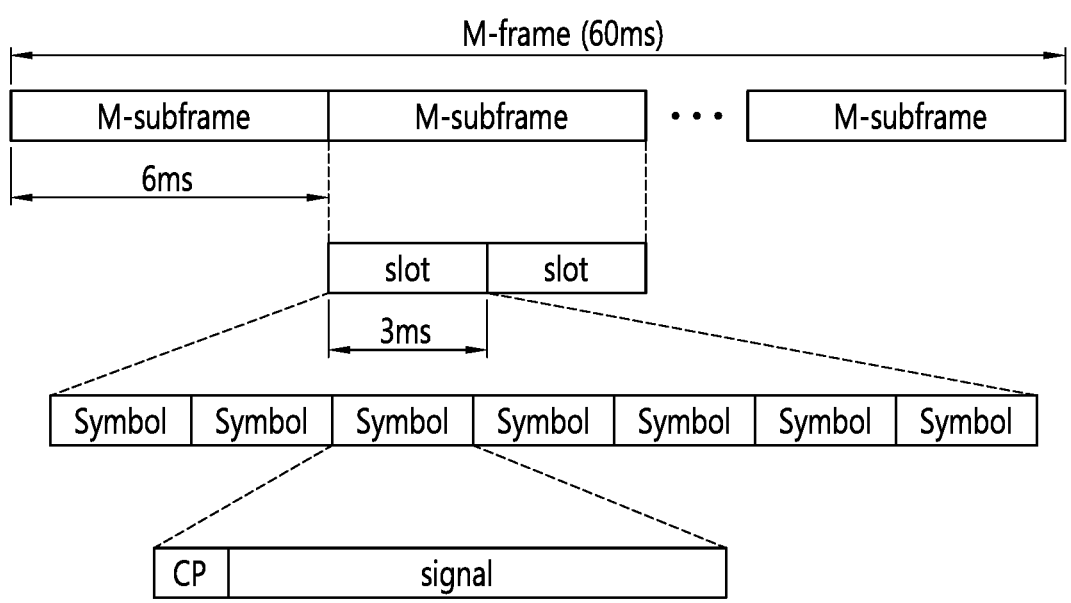
FIG. 7 illustrates an example of time resources that can be used for NB-IoT in M-frame units.

FIG. 7 illustrates an example of time resources that can be used for NB-IoT in M-frame units.

Referring to FIG. 7, a frame that may be used for the NB-IoT may be referred to as an M-frame, and the length may be illustratively 60 ms. Also, a subframe that may be used for the NB IoT may be referred to as an M-subframe, and the length may be illustratively 6 ms. Thus, an M-frame may include 10 M-subframes.

Each M-subframe may include two slots, and each slot may be illustratively 3 ms.

However, unlike what is shown in FIG. 6, a slot that may be used for the NB IoT may have a length of 2 ms, and thus the subframe has a length of 4 ms and the frame may have a length of 40 ms. This will be described in more detail with reference to FIG. 7.

Figure 8:
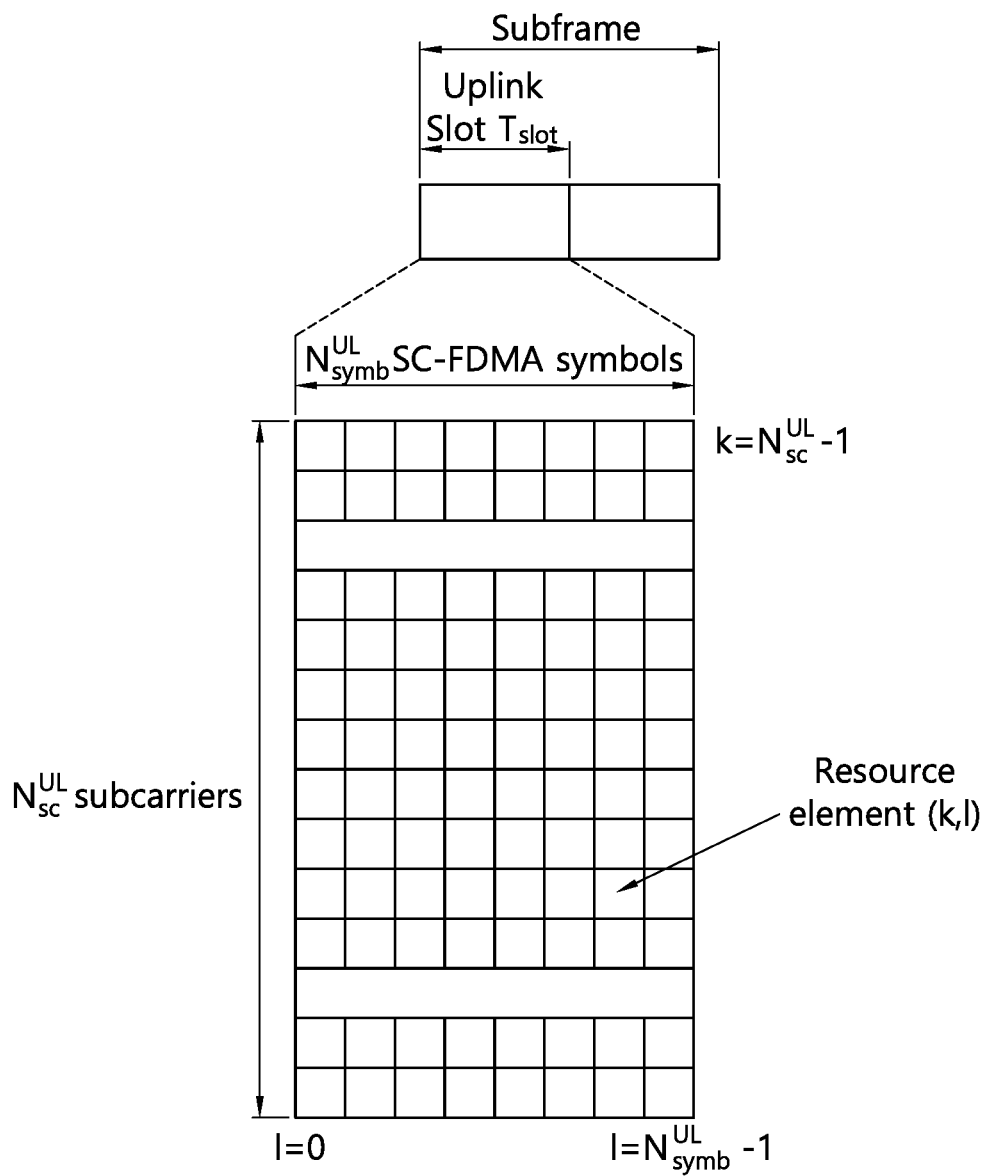
FIG. 8 is another illustration representing time resources and frequency resources that can be used for NB IoT.

FIG. 8 is another illustration representing time resources and frequency resources that can be used for NB IoT.

Referring to FIG. 8, a physical channel or a physical signal transmitted on a slot in an uplink of the NB-IoT includes NsymbUL SC-FDMA symbols in a time domain, and includes NscUL subcarriers in a frequency domain. The physical channels of the uplink may be divided into a Narrowband Physical Uplink Shared Channel (NPUSCH) and a Narrowband Physical Random Access Channel (NPRACH). In the NB-IoT, the physical signal may be Narrowband DeModulation Reference Signal (NDMRS).

The uplink bandwidth of the NscUL subcarriers during the Tslot slot in the NB-IoT is as follows.

TABLE 1

| Subcarrier spacing | $N_{sc}^{UL}$ | $T_{slot}$ |
|---|---|---|
| $\Delta f = 3.75$ kHz | 48 | $61440 * T_s$ |
| $\Delta f = 15$ kHz | 12 | $15360 * T_s$ |

In the NB-IoT, each resource element (RE) of the resource grid has k=0, $N_{sc}^{UL}$-1 indicating the time domain and frequency domain, when l is l=0, $N_{symb}^{UL}$-1, it can be defined as an index pair (k, l) in a slot.

In the NB-IoT, downlink physical channels include an NPDSCH (Narrowband Physical Downlink Shared Channel), an NPBCH (Narrowband Physical Broadcast Channel), and a NPDCCH (Narrowband Physical Downlink Control Channel). The downlink physical signal includes a narrowband reference signal (NRS), a narrowband synchronization signal (NSS), and a narrowband positioning reference signal (NPRS). The NSS includes a Narrowband primary synchronization signal (NPSS) and a Narrowband secondary synchronization signal (NSSS).

Meanwhile, NB-IoT is a communication scheme for wireless devices which use reduced bandwidth (namely narrow bandwidth) to realize low-complexity/low-cost operation. The NB-IoT communication aims to allow a large number of wireless devices to be connected to each other within the reduced bandwidth. Moreover, NB-IoT communication aims to support cell coverage larger than the cell coverage provided by the legacy LTE communication.

Meanwhile, as shown in Table 1 above, a carrier using the reduced bandwidth includes only one PRB if subcarrier spacing is 15 kHz. In other words, NB-IoT communication may be performed by using only one PRB.

On the other hand, since NB-IoT communication uses narrow bandwidth, a base station may not transmit a downlink control channel (namely NPDCCH) and downlink data channel (namely NPDSCH) on the same subframe. In other words, if the base station transmits an NPDCCH on subframe n, an NPDSCH may be transmitted on subframe n+k.

As described above, if an NPDCCH and an NPDSCH are transmitted on different subframes, a legacy HARQ operation may cause a considerable time delay. More specifically, the time delay will be described with reference to FIG. 9.

Figure 9:
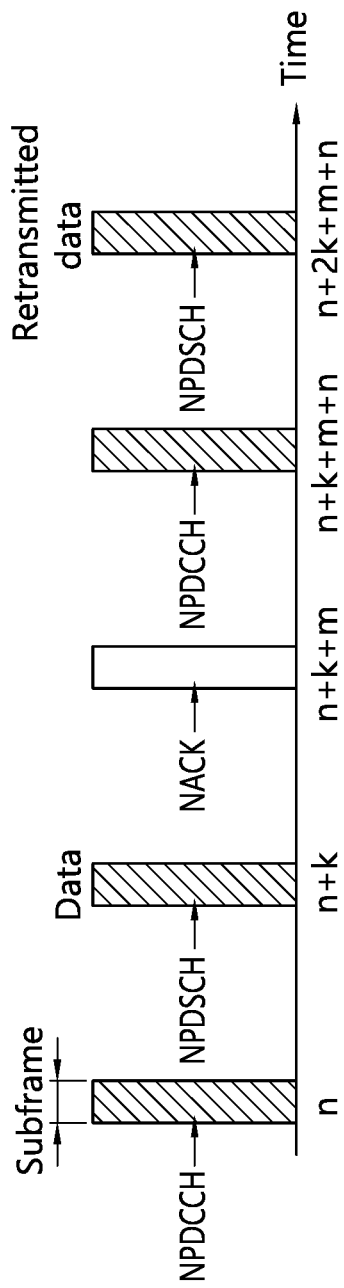
FIG. 9 illustrates an example of a conventional HARQ operation in NB IoT communication.

FIG. 9 illustrates an example of a conventional HARQ operation in NB IoT communication.

Referring to FIG. 9, a base station transmits an NPDCCH on the subframe n. The NPDCCH includes scheduling information about an NPDSCH. And the base station transmits an NPDSCH including data on the subframe n+k.

If a wireless device fails to receive and decode the NPDSCH on the subframe n+k, the wireless device transmits an HARQ NACK signal on the n+k+m subframe.

Then, after transmitting an NPDCCH on the subframe n+k+m+n, the base station transmits an NPDSCH including re-transmitted data on the subframe n+2k+m+n.

As described above, the conventional HARQ operation causes a considerable time delay.

Disclosure of the Present Specification

In what follows, the present specification refers to a device operating within reduced bandwidth according to a low-complexity/low-capability/low-specification/low-cost requirement as an LC device or bandwidth reduced (BL) device or NB-IoT device.

The present specification proposes a method for operating two HARQ processes for the purpose of solving the aforementioned problem, namely reducing the time delay. However, it should be noted that although a method for operating two HARQ processes disclosed in the present specification is described as being applied to NB IoT communication for the purpose of convenience, the disclosed method may also be applied to other general communication.

Figure 10A:
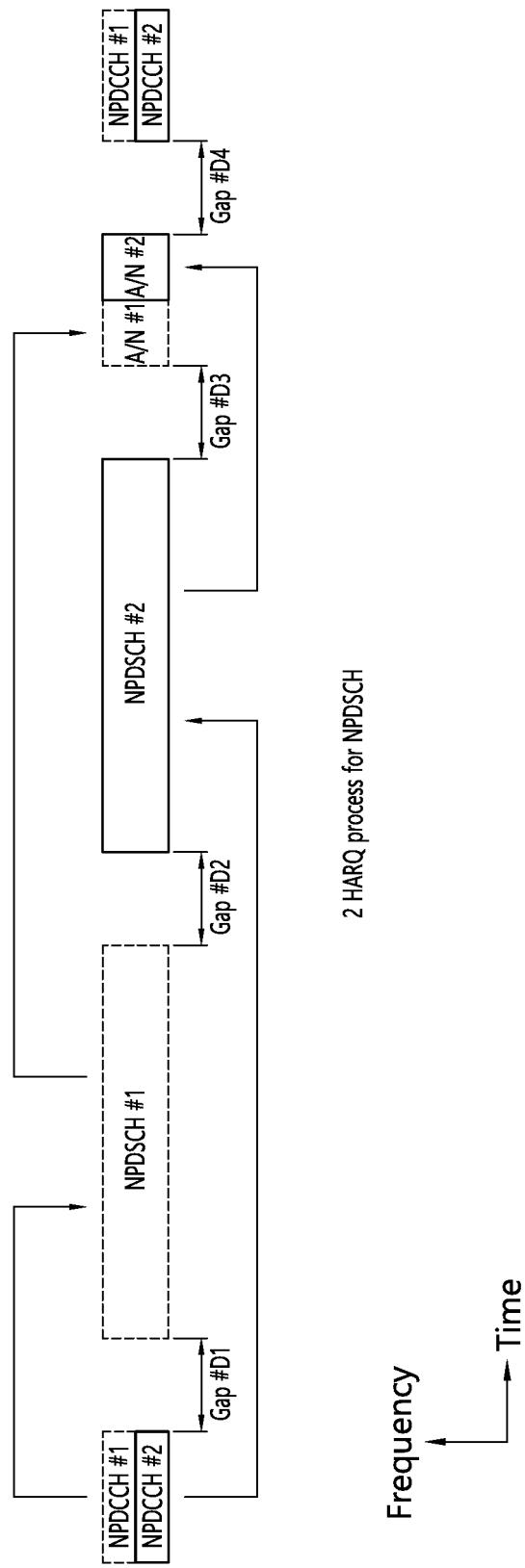
FIGS. 10a, 10b, and 10c illustrate an example of operating two HARQ processes according to a disclosure of the present specification.
Figure 10B:
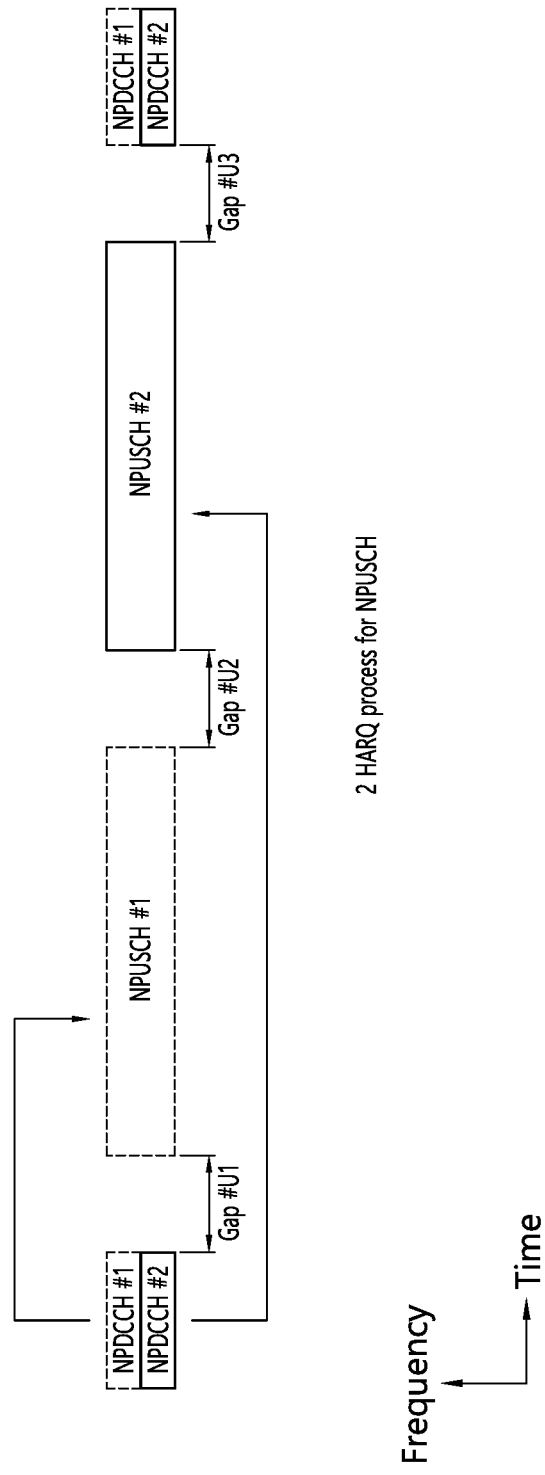
Figure 10C:
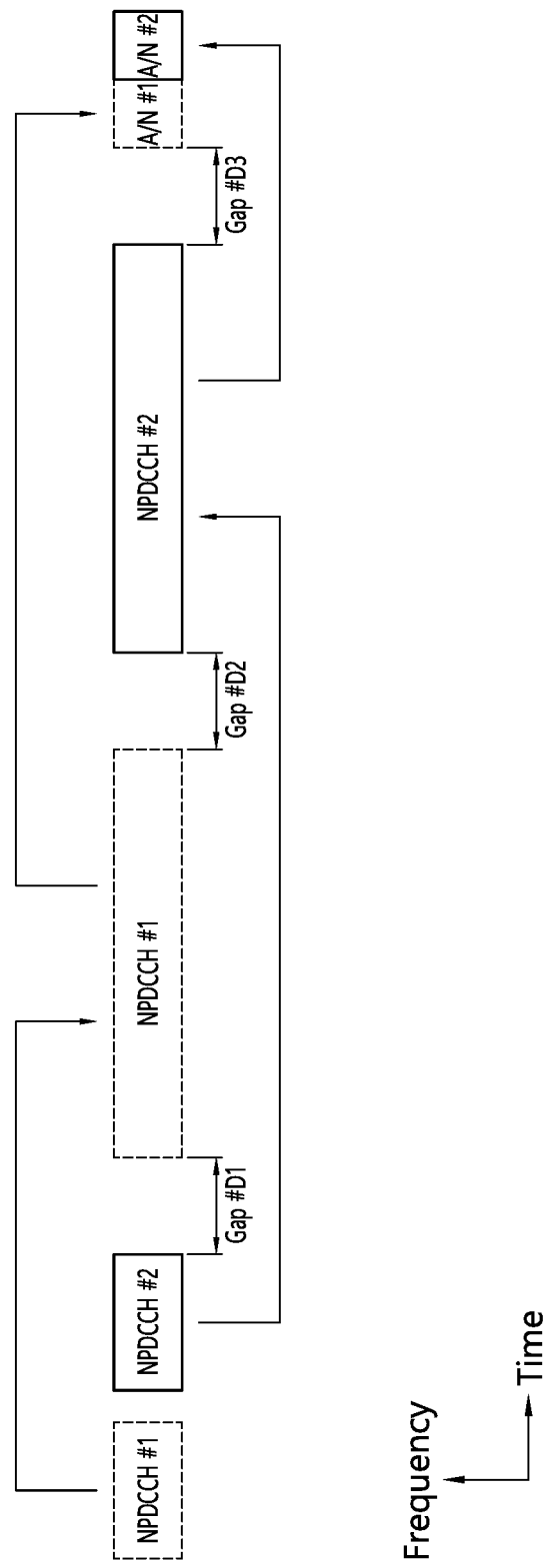

FIGS. 10a, 10b, and 10c illustrate an example of operating two HARQ processes according to a disclosure of the present specification.

Referring to FIGS. 10a and 10c, an NB-IoT device receives NPDCCH #1 and NPDCCH #2. The NPDCCH #1 and NPDCCH #2 may be received on the same subframe as shown in FIG. 10a and may be received on different subframes as shown in FIG. 10c. The NPDCCH #1 includes scheduling information for NPDSCH #1 on the subframes subsequent to gap #D1. The NPDCCH #2 includes scheduling information for NPDSCH #2 on the subframes after gap #2 subsequent to the NPDSCH #1.

After receiving the NPDSCH #1 and the NPDSCH #2, the NB-IoT device transmits an NPUSCH including HARQ ACK/NACK signals on the subframes after gap #D3 subsequent to the NPDSCH #2.

If the HARQ ACK/NACK signal indicates NACK, the base station transmits the NPDCCH #1 and NPDCCH #2 on the subframes after gap #D4 and then re-transmits the NPDSCH #1 and the NPDSCH #2.

Meanwhile, referring to FIG. 10b, an NB-IoT device receives the NPDCCH #1 and NPDCCH #2. The NPDCCH #1 includes scheduling information for NPUSCH #1 on the subframes after gap #U1. The NPDCCH #2 includes scheduling information for NPUSCH #2 on the subframes after gap #U2 subsequent to the NPUSCH #1. After receiving the NPDCCH #1 and NPDCCH #2, the NB-IoT device transmits the NPUSCH #1 and the NPUSCH #2.

Then the eNB transmits HARQ ACK/NACK signals for NPUSCH #1 and NPUSCH #2 on the subframes after gap #U3.

A. First Disclosure: Capability Information of UE as to Whether the UE May Drive Two HARQ Processes NB-IoT devices may have to report their capability information to a base station to receive two HARQ processes. Part of NB-IoT devices connected to a particular base station may not have the capability to support two HARQ processes. For example, NB-IoT devices based on the conventional Rel-13 specification may not have the capability to support two HARQ processes since two HARQ processes are not defined for those devices. Similarly, part of NB-IoT devices based on the Rel-14 specification may be designed not to support two HARQ processes due to implementation difficulties and so on. Therefore, to support a base station in determining whether to allow a specific NB-IoT device to use two HARQ processes, the NB-IoT device may have to transmit its capability information to the base station. At this time, the capability information may be on/off information expressed by 1 bit. For example, when information of 1 is transmitted, the base station may recognize that the corresponding NB-IoT device is an NB-IoT device which supports two HARQ processes. However, when information of 0 is transmitted, the base station may determine not to allow the corresponding NB-IoT device to use two HARQ processes.

Also, NB-IoT devices supporting two HARQ processes may exhibit different capabilities. For example, a particular NB-IoT device may have higher complexity than other NB-IoT devices and may be equipped with a higher capacity and faster memory, which may result in different capability of operating two HARQ processes. Therefore, capabilities of NB-IoT devices supporting two HARQ processes may be divided into multiple classes. In this case, an NB-IoT device may report information about its class to the base station. For example, suppose the capability of operating two HARQ processes is divided into three levels; in this case, two bits may be used so that 00 expresses NB-IoT devices incapable of operating two HARQ processes, and the remaining 01, 10, and 11 bit patterns are used to express the respective levels.

When an NB-IoT device determines its capability, it selects one from among fixed capability classes predetermined based on the capability of operating two HARQ processes and report the selected one to the base station. Similarly, besides the predetermined, fixed capability classes, by taking into account additional requirements such as coverage extension (CE) level, the NB-IoT device may select its capability to be reported.

After reporting the capability of operating two HARQ processes reported through the methods described above, the NB-IoT device may expect to be configured by the base station to use two HARQ processes at a level equal to or lower than the capability that the NB-IoT device has reported.

The information of the capability of operating two HARQ processes may be reported through transmission of the third message during the random access process shown in FIG. 3.

After receiving information about capability of operating two HARQ processes, the base station may determine which HARQ process to support in order to meet the capability of an NB-IoT device and payload characteristics. The base station may inform the NB-IoT device of the determination result through RRC signaling or DCI information. If the corresponding information is transmitted through RRC signaling, the NB-IoT device may determine the DCI format to be monitored by the NB-IoT device itself according to the maximum number of HAQR processes determined by the base station. If the corresponding information is transmitted through DCI, the NB-IoT device may check the capability possessed by the base station through RRC signaling. If RRC signaling which indicates that the base station supports two HARQ processes is not received, the NB-IoT device may expect one HARQ process and monitor the DCI format suitable for this situation.

B. Second Disclosure: Configuration of Gap Between Two NPDSCHs and/or Between Two NPUSCHs Due to various constraints such as complexity, cost, and battery life, NB-IoT devices may be limited in terms of performance compared with ordinary UEs, and to take into account the decoding latency of an NB-IoT device, a gap may be set up after an NPDSCH is received or before an NPUSCH is transmitted. Therefore, when two contiguous NPDSCHs are received or two contiguous NPUSCHs are transmitted, a time gap which takes into account processing time may be needed. At this time, the size of a required time gap may differ according to the capability of an NB-IoT device for operating two HARQ processes. For example, in the case of an NB-IoT device having higher capability such as higher complexity and/or memory with a higher capacity and faster speed, a small-sized gap may be configured to be used while, in the case of an NB-IoT device having lower capability such as low complexity and/or a memory with a smaller capacity and slower speed, a large-sized gap may be configured to be used. This is so determined that an NB-IoT device may be allowed to support two HARQ processes even if the NB-IoT device has low capability for operating two HARQ processes. Moreover, even when an NB-IoT device has already higher capability, the gap size may be used to obtain still higher throughput and still smaller latency.

The gap size to be used by an NB-IoT device may be determined by a base station. A base station may directly configure the information about the gap size. For example, a base station may inform an NB-IoT device of the information about a plurality of gap size candidates through RRC signaling. Also, the base station may inform of index information of a gap size to be used by a specific NB-IoT device through DCI. Similarly, instead of configuring a separate gap size, the gap size may be configured indirectly by indicating scheduling information for two NPDSCHs (or NPUSCHs), respectively. For example, in the case of two HARQ processes supporting two NPDSCHs, the timing of a starting subframe of the first NPDSCH may be set to T1, and the timing of a starting subframe of the second NPDSCH may be set to T2. At this time, when the duration of the first NPDSCH is TD1, the gap between the two NPDSCHs may be determined as T2−(T1+TD1).

C. Third Disclosure: ACK/NACK Transmission

A method for transmitting an ACK/NACK signal by using two HARQ processes may be performed by using one of the following methods.

Method C-1) This method reuses the ACK/NACK transmission timing designed for the UEs based on the Rel-13 and transmits ACK/NACK signals for two NPDSCHs (or NPUSCHs) independently through different slots (or subframes).

Method C-1-a) This method determines whether to apply $k_{offset}$ to the delay of ACK/NACK transmission timing according to the order of NPDSCHs and transmits ACK/NACK signals for two NPDSCHs (or NPUSCHs) independently through different slots (or subframes).

Method C-1-b) This method determines whether to apply $k_{offset}$ to the delay of ACK/NACK transmission timing according to the HARQ process ID and transmits ACK/NACK signals for two NPDSCHs (or NPUSCHs) independently through different slots (or subframes).

Method C-2) This method transmits ACK/NACK signals for two NPDSCHs (or NPUSCHs) by combining the ACK/NACK signals by using a QPSK symbol.

Method C-3) This method transmits ACK/NACK signals for two NPDSCHs (or NPUSCHs) by combining the ACK/NACK signals through an ACK/NACK bundling technique.

Method C-3-a) This method transmits ACK/NACK signals for two NPDSCHs (or NPUSCHs) by combining the ACK/NACK signals through an ACK/NACK bundling technique. At this time, phase rotation may be performed as many times as the number of NPDCCHs that has been decoded successfully by an NB-IoT device.

Method C-4) This method transmits a combination of ACK/NACK responses to two PDSCHs by forming the combination by selecting one of two different ACK/NACK resources (for example, a frequency and time resources) and Binary Phase Shift Keying (BPSK) modulation of the corresponding resource.

When the method C-1 is used, each ACK/NACK transmission timing may be determined by the HARQ-ACK resource specified by DCI. This operation has an advantage that two HARQ processes may be supported while a predefined timing relationship is still maintained.

When the method C-1-a is used, based on one ACK/NACK transmission timing, the other remaining ACK/NACK transmission timing may be determined. At this time, the ACK/NACK transmission timing may be determined to be dependent on the order in which NPDSCHs appear. For example, based on the ACK/NACK transmission timing determined based on the second NPDSCH, the ACK/NACK transmission timing of the first NPDSCH may be determined. Here, determining the ACK/NACK timing based on the second NPDSCH may indicate that the ACK/NACK transmission timing is determined by a timing offset predetermined based on the time point at which the second NPDSCH transmission is completed or by a timing offset specified by the DCI which schedules the corresponding NPDSCH. In this case, if the ACK/NACK transmission timing is determined as k0 through DCI of an NPDCCH associated with the second ACK/NACK transmission timing, the first ACK/NACK transmission timing may be determined as k0+$k_{offset}$. At this time, the value of $k_{offset}$ may be determined by a higher layer parameter as used in the RRC signaling. Similarly, the value of $k_{offset}$ may be determined by the number of slots of an ACK/NACK signal used for the first NPDSCH (or second NPDSCH). For example, when the ACK/NACK signal for the first NPDSCH is determined to precede the ACK/NACK signal for the second NPDSCH, the $k_{offset}$ value may be defined as a function of the number of slots $N_1$ to be used for the ACK/NACK signal for the first NPDSCH. In this example, if subcarrier spacing of 15 kHz is used for transmission of an ACK/NACK signal, $k_{offset}$ may be defined as $-N_1/2$. Similarly, if subcarrier spacing of 3.75 kHz is used, $k_{offset}$ may be defined as $-N_1*2$. As another example, when the ACK/NACK signal for the first NPDSCH is determined to follow the ACK/NACK signal for the second NPDSCH, the $k_{offset}$ value may be defined as a function of the number of slots $N_2$ to be used for the ACK/NACK signal for the second NPDSCH. In this example, if subcarrier spacing of 15 kHz is used for transmission of an ACK/NACK signal, $k_{offset}$ may be defined as $N_2/2$. On the other hand, if subcarrier spacing of 3.75 kHz is used, $k_{offset}$ may be defined as $N_2*2$. If the ACK/NACK transmission timing for the first NPDSCH is determined relatively by using the ACK/NACK transmission timing for the second NPDSCH, and decoding of the second NPDCCH fails, the ACK/NACK transmission timing for the first NPDSCH may be determined by the HARQ-ACK resource specified through DCI of the first NPDCCH. In the method described above, if both of the two NPDCCHs are decoded, the frequency resource to which the first ACK/NACK signal is to be transmitted may be determined to use the same position as that of the frequency resource to which the second ACK/NACK signal is to be transmitted.

When the method C-1-b is used, ACK/NACK transmission timing may be determined by the HARQ process ID (a different value from NDI) included in the DCI field of the NPDCCH associated with each NPDSCH. If 1 bit is used for the HARQ process ID in the DCI field, different scheduling delays may be applied for two cases represented by the 1 bit. For example, if the bit which indicates the HARQ process ID in the DCI of a decoded NPDCCH has a value of 0, the ACK/NACK transmission timing may be determined based on the ACK/NACK transmission timing defined in the existing Rel-13 specification. On the contrary, if the bit which indicates the HARQ process ID in the DCI of a decoded NPDCCH has a value of 1, a newly defined ACK/NACK timing may be applied, or a method which adds $k_{offset}$ to the ACK/NACK transmission timing defined in the Rel-13 NB-IoT specification may be used. At this time, the value of $k_{offset}$ may be determined by a higher layer parameter as used in the RRC signaling. Similarly, the value of $k_{offset}$ may be determined to be dependent on the $R_{max}$ value defined by a higher layer parameter for an NPDCCH. For example, if the value of $k_{offset}$ used for $R_{max}<128$ is defined as $k_{offset}-1$, and the value of $k_{offset}$ used for $R_{max}\geq128$ is defined as $k_{offset}-2$, a relationship of $k_{offset}-1\leq k_{offset}-2$ may be established. In the method above, if both of the two NPDCCHs are decoded, the frequency resource to which the first ACK/NACK signal is to be transmitted may be determined to use the same position as that of the frequency resource to which the second ACK/NACK signal is to be transmitted.

When the method C-2 is used, ACK/NACK transmission timing for the case where both of the two NPDSCHs are received and for the case where only the second NPDSCH is received may be determined based on the second NPDSCH. In this case, the relationship between a bit pair representing an ACK/NACK signal and a complex-valued modulation symbol $x=I+jQ$ may be determined so as to maximize the distance between complex-valued modulation symbols representing the case where only the second NPDSCH is received. Also, a method for representing complex-valued modulation symbols may be determined so that the case where decoding of an NPDCCH associated with the first NPDSCH has failed and the case where decoding of an NPDCCH associated with the first NPDSCH has succeeded, but decoding of the first NPDSCH has failed are handled in the same way by using a NACK signal. Table 2 below shows one example of complex-valued modulation symbols which may be used when two NPDSCHs are received by using the method C-2. Here, gray code may be taken into account as a pattern for determining complex-valued modulation symbols. Table 3 below shows an example where gray code is applied. Characteristically, in the following tables, 1 represents NACK, and 0 represents ACK.

When the method C-2 is used, if an NB-IoT device succeeds in decoding only one NPDCCH and decodes only one NPDSCH accordingly, a complex-valued modulation symbol may be used for the same ACK/NACK signal irrespective of an actual order of the NPDSCH. At this time, the ACK/NACK transmission timing may use the ACK/NACK transmission timing specified by DCI included in the NPDCCH for which decoding has been performed. Tables 2 to 4 show an example of complex-valued modulation symbols which may be used for ACK/NACK transmission when the method C-2 is used to decode only one NPDSCH. This is almost the same as the Binary Phase Shift Keying (BPSK) modulation mapping method used in the legacy LTE system. Here, as a pattern for determining complex-valued modulation symbols, gray code may be taken into account. Tables 5 and 6 below show one example where gray code is applied among methods for applying complex-valued modulation symbols which may be used for ACK/NACK transmission when the method C-2 is used to decode only one NPDSCH. In the following tables, 1 represents NACK, and 0 represents ACK.

TABLE 2

| ACK/NACK bit for 1$^{st}$ NPDSCH | ACK/NACK bit for 2$^{nd}$ NPDSCH | I | Q |
|---|---|---|---|
| 0 | 0 | 1/$\sqrt{2}$ | 1/$\sqrt{2}$ |
| 0 | 1 | −1/$\sqrt{2}$ | −1/$\sqrt{2}$ |
| 1 | 0 | 1/$\sqrt{2}$ | −1/$\sqrt{2}$ |
| 1 | 1 | −1/$\sqrt{2}$ | 1/$\sqrt{2}$ |

TABLE 3

| ACK/NACK bit for 1$^{st}$ NPDSCH | ACK/NACK bit for 2$^{nd}$ NPDSCH | I | Q |
|---|---|---|---|
| 0 | 0 | 1/$\sqrt{2}$ | 1/$\sqrt{2}$ |
| 0 | 1 | −1/$\sqrt{2}$ | −1/$\sqrt{2}$ |
| 1 | 0 | −1/$\sqrt{2}$ | 1/$\sqrt{2}$ |
| 1 | 1 | 1/$\sqrt{2}$ | −1/$\sqrt{2}$ |

In the table above, when a value indicated by the ACK/NACK signal for the 2$^{nd}$ NPDSCH is changed, both of the I and Q are mapped to change their sign, and when a value indicated by the ACK/NACK signal for the 1$^{st}$ NPDSCH is changed, only one of the I or Q changes its sign.

TABLE 4

| ACK/NACK bit for 1$^{st}$ NPDSCH | ACK/NACK bit for 2$^{nd}$ NPDSCH | I | Q |
|---|---|---|---|
| 0 | 0 | 1/$\sqrt{2}$ | 1/$\sqrt{2}$ |
| 0 | 1 | 1/$\sqrt{2}$ | −1/$\sqrt{2}$ |
| 1 | 0 | −1/$\sqrt{2}$ | 1/$\sqrt{2}$ |
| 1 | 1 | −1/$\sqrt{2}$ | −1/$\sqrt{2}$ |

In the tables above, if a value indicated by the ACK/NACK bit for the 2$^{nd}$ NPDSCH is changed, the value of Q is changed to exhibit the maximum distance difference. More specifically, the value of I expresses ACK/NACK for the 1$^{st}$ NPDSCH, and the value of Q expresses ACK/NACK of the 2$^{nd}$ NPDSCH.

TABLE 5

| ACK/NACK bit for NPDSCH | I | Q |
|---|---|---|
| 0 | 1/$\sqrt{2}$ | 1/$\sqrt{2}$ |
| 1 | −1/$\sqrt{2}$ | −1/$\sqrt{2}$ |
| — | 1/$\sqrt{2}$ | −1/$\sqrt{2}$ |
| — | −1/$\sqrt{2}$ | 1/$\sqrt{2}$ |

TABLE 6

| ACK/NACK bit for NPDSCH | I | Q |
|---|---|---|
| 0 | 1/$\sqrt{2}$ | 1/$\sqrt{2}$ |
| 1 | 1/$\sqrt{2}$ | −1/$\sqrt{2}$ |
| — | −1/$\sqrt{2}$ | 1/$\sqrt{2}$ |
| — | −1/$\sqrt{2}$ | −1/$\sqrt{2}$ |

In the table above, each time the value indicated by the ACK/NACK bit for NPDSCH is changed, the value of Q is changed to exhibit the maximum distance difference.

Similarly, by using the method C-2, complex-valued modulation may be performed differently according to the ACK/NAKC signal corresponding to the HARQ process ID of each PDSCH. Tables 7 and 8 below illustrate such an example. In the method described above, gray code may be taken into account as a pattern for determining complex-valued modulation symbols. Table 9 below illustrates an example for designating complex-valued modulation configured according to the ACK/NACK corresponding to the HARQ process ID by using gray code. In the following tables, 1 represents NACK, and 0 represents ACK.

TABLE 7

| ACK/NACK bit for HARQ process ID 0 | ACK/NACK bit for HARQ process ID 1 | I | Q |
|---|---|---|---|
| 0 | 0 | 1/$\sqrt{2}$ | 1/$\sqrt{2}$ |
| 0 | 1 | −1/$\sqrt{2}$ | −1/$\sqrt{2}$ |
| 1 | 0 | 1/$\sqrt{2}$ | −1/$\sqrt{2}$ |
| 1 | 1 | −1/$\sqrt{2}$ | 1/$\sqrt{2}$ |

TABLE 8

| ACK/NACK bit for HARQ process ID 0 | ACK/NACK bit for HARQ process ID 1 | I | Q |
|---|---|---|---|
| 0 | 0 | 1/$\sqrt{2}$ | 1/$\sqrt{2}$ |
| 0 | 1 | −1/$\sqrt{2}$ | −1/$\sqrt{2}$ |
| 1 | 0 | −1/$\sqrt{2}$ | 1/$\sqrt{2}$ |
| 1 | 1 | 1/$\sqrt{2}$ | −1/$\sqrt{2}$ |

TABLE 9

| ACK/NACK bit for HARQ process ID 0 | ACK/NACK bit for HARQ process ID 1 | I | Q |
|---|---|---|---|
| 0 | 0 | 1/$\sqrt{2}$ | 1/$\sqrt{2}$ |
| 0 | 1 | −1/$\sqrt{2}$ | −1/$\sqrt{2}$ |
| 1 | 0 | 1/$\sqrt{2}$ | −1/$\sqrt{2}$ |
| 1 | 1 | −1/$\sqrt{2}$ | 1/$\sqrt{2}$ |

As another method for expressing complex values I and Q based on the method C-2, one ACK/NACK signal may be expressed by using BPSK constellation while the other ACK/NACK signal is expressed by using additional phase rotation. More specifically, if an NB-IoT device succeeds in decoding DCI of both of two NPDCCHs, information for the ACK/NACK signal for the second NPDSCH may be determined by using the BPSK constellation. On the other hand, if a decoding result for the first NPDSCH is ACK, phase rotation of $\pi/2$ (or $-\pi/2$) may be applied to the BPSK constellation result of the ACK/NACK signal for the second NPDSCH while, in the case of NACK, the BPSK constellation result of the ACK/NACK signal for the second NPDSCH may be reused. In this case, as a result, the constellation used by the NB-IoT device has the same form as the Quadrature Phase Shift Keying (QPSK) constellation. Also, it is advantageous that a base station is able to figure out the ACK/NACK for both of the two NPDSCHs irrespective of the number of NPDCCH DCIs that the NB-IoT device has successfully decoded. Characteristically, if the NPUSCH format 2 is reused, ACK/NACK information for the first NPDSCH is not limited only to the data region of symbols used for the NPUSCH format 2 but may be applied over the whole transmission block. This may be intended to maintain the effect of reducing Peak to Average Power Ratio (PAPR) that may be achieved from $\pi/2$ BPSK.

If the method C-3 is used, both of two NPDCCHs are successfully decoded, and ACK is generated for both of two NPDSCHs, an NB-IoT device transmits ACK information. However, if one or more of the two NPDSCHs generates NACK, the NB-IoT device may transmit a NACK signal. The ACK/NACK transmission timing used for this case may be determined based on the second NPDSCH. On the other hand, if only one NPDCCH has been decoded successfully, ACK/NACK signal for the corresponding NPDSCH may be transmitted. The ACK/NACK resource used for this case may be determined according to the corresponding NPDSCH. If the method C-3-a is used, both of two NPDCCHs are successfully decoded, and ACK is generated for both of two NPDSCHs, an NB-IoT device transmits ACK information. However, if one or more of the two NPDSCHs generates NACK, the NB-IoT device may transmit a NACK signal. In this case, information where one or more ACK/NACK responses are bundled by using modulation and information about the position at which decoding of NPDCCH DCI has been performed successfully may be transmitted. The ACK/NACK transmission timing used for this case may be determined based on the second NPDSCH. On the other hand, when only one NPDCCH is decoded successfully, an ACK/NACK signal may be transmitted through an ACK/NACK resource obtained through the corresponding NPDCCH DCI, but phase rotation by $\pi/2$ may be performed additionally. This may be intended to support a base station in determining whether a NB-IoT device has successfully decoded an NPDCCH. A result obtained by using the method described above may be expressed in the form of QPSK constellation. Tables 10 and 11 below show an example of the method described above. In the following tables, 1 represents NACK, and 0 represents ACK.

TABLE 10

| Number of decoded NPDCCHs | ACK/NACK bit for NPDSCH(s) | I | Q |
|---|---|---|---|
| 1 | 0 | $1/\sqrt{2}$ | $1/\sqrt{2}$ |
| 1 | 1 | $-1/\sqrt{2}$ | $-1/\sqrt{2}$ |
| 2 | 0 | $1/\sqrt{2}$ | $-1/\sqrt{2}$ |
| 2 | 1 | $-1/\sqrt{2}$ | $1/\sqrt{2}$ |

TABLE 11

| Number of decoded NPDCCHs | ACK/NACK bit for NPDSCH(s) | I | Q |
|---|---|---|---|
| 1 | 0 | $1/\sqrt{2}$ | $1/\sqrt{2}$ |
| 1 | 1 | $-1/\sqrt{2}$ | $-1/\sqrt{2}$ |
| 2 | 0 | $-1/\sqrt{2}$ | $1/\sqrt{2}$ |
| 2 | 1 | $1/\sqrt{2}$ | $-1/\sqrt{2}$ |

As a specific example of the method C-4, if both of two NPDCCHs are decoded successfully, the ACK/NACK for the first NPDSCH may be distinguished by using a time (or frequency) resource while the ACK/NACK for the second NPDSCH may be distinguished by using BPSK. At this time, transmission timing for the ACK/NACK may be determined based on the transmission timing for the ACK/NACK corresponding to the second NPDSCH.

As an example of the method C-4, suppose a time resource is used to distinguish the ACK/NACK for the NPDSCH. If a decoding result of the first NPDSCH is NACK, ACK/NACK transmission timing for the second NPDSCH may be reused while, if a decoding result of the first NPDSCH is ACK, ACK/NACK may be transmitted to the position at which the ACK/NACK transmission timing for the second NPDSCH is offset by applying $k_{offset}$. The value of $k_{offset}$ used for this case may be configured through parameters of higher layer signaling or determined dependently according to the number of slots used for ACK/NACK corresponding to the second NPDSCH. When an NB-IoT device decodes only one NPDCCH, the ACK/NACK transmission timing specified by DCI included in the corresponding NPDCCH may be reused. If the example described above is applied, the ACK/NACK transmission timing may express the ACK/NACK information for the first NPDSCH, and BPSK may express the ACK/NACK information for the second NPDSCH. If both of the two NPDCCHs are decoded in the example above, the frequency resource used for the ACK/NACK response may be determined based on the frequency resource allocated to the second ACK/NACK resource.

As another example of the method C-4, if a decoding result of the first NPDSCH is NACK, a frequency resource $f_1$ may be used at the ACK/NACK transmission timing for the second NPDSCH to transmit an ACK/NACK response while, if a decoding result of the first NPDSCH is ACK, a frequency resource $f_2$ may be used at the ACK/NACK transmission timing for the second NPDSCH to transmit an ACK/NACK response. At this time, $f_1$ may be a subcarrier index specified through an HARQ-ACK resource indicated by the DCI field corresponding to the second NPDSCH. Also, $f_2$ may be a value specified by $f_1 \pm 1$. At this time, the area used by $f_2$ may be set not to exceed the range of a subcarrier index specified for the purpose of ACK/NACK signaling. For example, suppose $f_2 = f_1 + 1$, and the subcarrier spacing is 15 kHz. When an available ACK/NACK subcarrier index ranges from 0 to 3, if $f_1$ is 3, 0 may be used instead of $f_2 = 3 + 1 = 4$. The example above may be expressed mathematically as $f_2 = (f_1 + 1) \mod 4$. If an NB-IoT device decodes only one NPDCCH, the ACK/NACK transmission timing and subcarrier index specified through an HARQ-ACK resource included in the DCI of the corresponding NPDCCH may be used. Similarly, $f_1$ and $f_2$ may be frequency resources designated through different DCIs. For example, the value of $f_1$ may be a value determined through an NPDCCH associated with the first NPDSCH, and the value of $f_2$ may be a value determined through an NPDCCH associated with the second NPDSCH. In this case, if a decoding result of the first NPDSCH is ACK, $f_1$ may be used as the ACK/NACK frequency resource while, if a decoding result of the first NPDSCH is NACK, $f_2$ may be used as the ACK/NACK frequency resource. If the examples described above are used, the ACK/NACK frequency resource may express the ACK/NACK information for the first NPDSCH, and BPSK may express the ACK/NACK information for the second NPDSCH.

In the NB-IoT communication, a method for transmitting ACK/NACK supporting two HARQ processes may be implemented by a combination of one or more of the methods described above for the purpose of preventing collision between an NPDSCH and an ACK/NACK signal. For example, if the ACK/NACK transmission timing required for the first NPDSCH may be determined by using the ACK/NACK transmission timing defined in the existing Rel-13 specification, an ACK/NACK signal may be transmitted by being distributed through the ACK/NACK transmission timing defined for each NPDSCH in the method C-1. However, if the ACK/NACK transmission timing required for the first NPDSCH may not be determined by using the ACK/NACK transmission timing defined in the existing Rel-13 specification, ACK/NACK signaling may be supported through the methods C-1, C-2, C-3 and/or C-4.

A method for transmitting an ACK/NACK signal supporting two HARQ processes in the NB-IoT communication may be implemented by using a combination of one or more of the methods described above for the purpose of supporting various CE levels or various capabilities of NB-IoT devices. For example, in the case of NB-IoT devices located in a radio-friendly area within coverage, it may be more advantageous to transmit two independent ACK/NACK signals for the purpose of improving throughput and latency of the two HARQ processes. In this case, if it fails to transmit one NPDSCH (or NPUSCH), it may be supported in the subsequent re-transmission through an identified ACK/NACK signal that only one NPDSCH (or NPUSCH) is transmitted. On the other hand, in the case of NB-IoT devices located in a radio-unfriendly area within coverage or in the case of NB-IoT devices belonging to the class for which the maximum transmission power is small, it may be advantageous to use ACK/NACK bundling. This may be intended to increase the probability of detecting an ACK/NACK signal.

As described above, if two or more ACK/NACK transmission methods are combined in the two HARQ processes, a method for transmitting an ACK/NACK signal to be used by an NB-IoT device or a base station may be selected through signaling such as DCI. In this case, an NB-IoT device may expect to transmit or receive an ACK/NACK signal according to the ACK/NACK transmission method learned through the DCI. Similarly, the NB-IoT device may select a method for transmitting an ACK/NACK signal suitable for the capability of the NB-IoT device. For example, in the case of NB-IoT devices belonging to a class of low power, since quality of an uplink channel may be relatively low, it may be determined to use ACK/NACK bundling while, in the case of NB-IoT devices belonging to a normal power class, it may be determined to transmit an ACK/NACK signal through the method C-1 or C-2. To this purpose, an NB-IoT device may report its power class to the base station. A method for selecting a method for transmitting an ACK/NACK signal autonomously by an NB-IoT device may be determined by taking into account the capability of the NB-IoT device in addition to the power class to which the NB-IoT device belongs.

D. Fourth Disclosure: Method for Using NPDCCH Ordering

The fourth disclosure proposes a method for using a disposition structure of an NPDCCH as information when two HARQ processes are supported, and each NPDSCH (or NPUSCH) is scheduled by using two independent NPDCCHs. The disposition structure of NPDCCHs may be used as a reference based on which two independent NPDCCHs are distinguished through a time or frequency resource. For example, if NPDCCHs are disposed by being distinguished from each other on the time domain, an NPDCCH appearing at preceding timing may be defined as NPDCCH #1, and an NPDCCH appearing at the next timing may be defined as NPDCCH #2. As another example, an NPDCCH close to the center frequency of the frequency domain may be defined as NPDCCH #1, and an NPDCCH located relatively far away from the center frequency may be defined as NPDCCH #2. Similarly, an NPDCCH located at a relatively higher position in the frequency domain may be defined as NPDCCH #1, and an NPDCCH located at a relatively lower position thereof may be defined as NPDCCH #2.

A method for transmitting information by using the order of disposing NPDCCHs may use the order according to which an NPDSCH (or NPUSCH) scheduled by each NPDCCH appears as additional information. For example, suppose two HARQ processes support two NPDSCHs. If the first NPDSCH is defined as NPDSCH #1, and the second NPDSCH is defined as NPDSCH #2, information about which of the NPDSCH #1 and NPDSCH #2 is scheduled by NPDCCH #1 may be utilized. NPDSCH #1 and NPDSCH #2 are determined by a relative starting subframe timing. Therefore, if the order of NPDSCH scheduled by NPDCCH #1 is determined, the order of NPDSCH scheduled by NPDCCH #2 may be determined subsequently.

The operation above will be described in more detail with reference to FIG. 11.

Figure 11A:
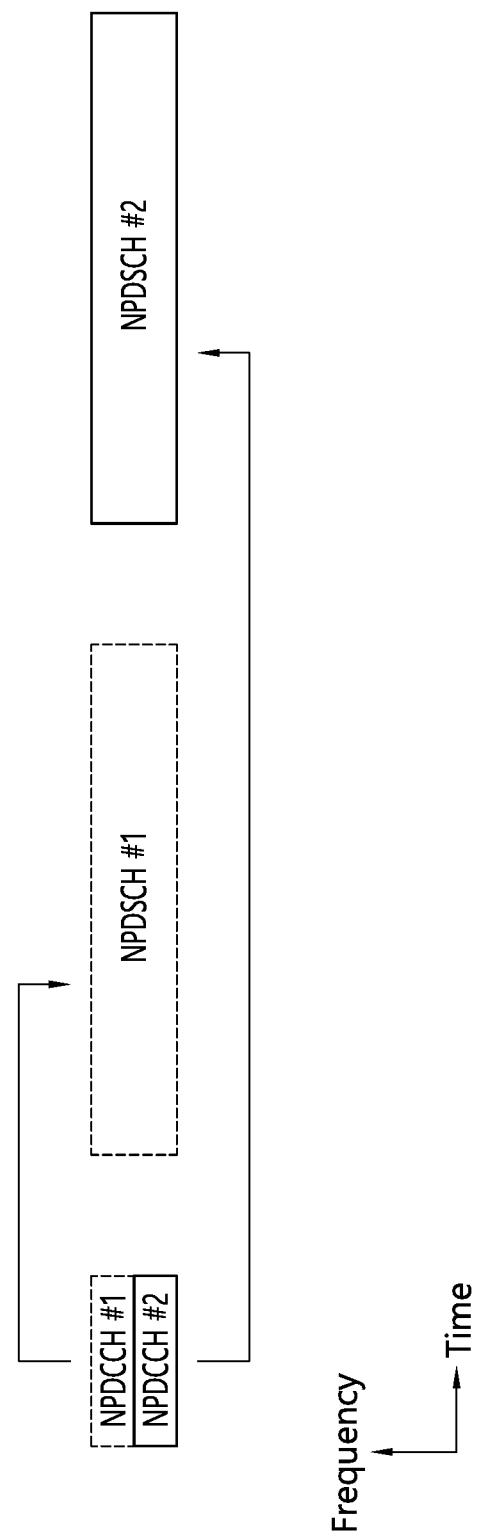

FIGS. 11a and 11b illustrate an example in which two HARQ processes are used for NPDSCHs.

Referring to FIGS. 11a and 11b, after decoding NPDCCHs, an NB-IoT device may identify the order of the NPDSCHs by comparing the starting subframe timings of the NPDSCHs and recognize the identified order as information.

More specifically, referring to FIG. 11a, an NPDCCH located at a higher position on the frequency axis may be defined as NPDCCH #1, and an NPDCCH located at a lower position of the frequency axis may be defined as NPDCCH #2. Meanwhile, the first NPDSCH on the time axis may be defined as NPDSCH #1, and the second NPDSCH may be defined as NPDSCH #2. NPDSCH #1 may be scheduled by NPDCCH #1, and then NPDSCH #2 may be scheduled by NPDCCH #2.

Referring to FIG. 11b, an NPDCCH located at a higher position on the frequency axis may be defined as NPDCCH #1, and an NPDCCH located at a lower position of the frequency axis may be defined as NPDCCH #2. Meanwhile, the first NPDSCH on the time axis may be defined as NPDSCH #1, and the second NPDSCH may be defined as NPDSCH #2. NPDSCH #2 may be scheduled by NPDCCH #1, and then NPDSCH #1 may be scheduled by NPDCCH #2.

Meanwhile, the method for using the order of disposing NPDCCHs as information may consider adding a bit which expresses the order of two HARQ processes into the DCI of each NPDCCH. For example, 1 bit of DCI may be utilized for the aforementioned purpose. More specifically, in one example, the order of NPDCCHs may be identified by allocating the value of bit 1 to NPDCCH #2 if bit 0 is allocated to NPDCCH #1 while allocating bit 0 to NPDCCH #2 if bit 1 is allocated to NPDCCH #1. When a method for using the order of NPDCCHs and DCI bit is employed, the amount of information that may be expressed may be determined by the size of DCI bits. For example, if DCI of N bits is used for the aforementioned purpose, the number of pieces of information that may be expressed may amount up to $2^N$.

The information according to the aforementioned method may be used for defining a gap between two NPDSCHs (or NPUSCHs). The method above may be used in such a case where one or more gap sizes may be configured by taking into account a factor such as capability of an NB-IoT device for two HARQ processes. To this purpose, a base station may inform an NB-IoT device of information about a plurality of gap size candidates by using a higher layer signal as used in RRC signaling. In this case, an NB-IoT device may determine which gap size to use through the information expressed by using the order of NPDCCHs.

Also, the information according to the aforementioned method may be used for determining a method for transmitting an ACK/NACK signal. If two or more ACK/NACK signals are transmitted, a base station may determine which ACK/NACK transmission is performed or expected by an NB-IoT device by using the proposed PDCCH ordering.

E. Fifth Disclosure: DCI Format

The number of HARQ processes operating in an NB-IoT device which supports two HARQ processes may be one or two. In order not to increase the burden on the blind decoding of an NB-IoT device, it may be advantageous to use the same DCI format regardless of the number of HARQ processes. To this purpose, information which indicates up to two HARQ processes may be added to the DCI format for an NB-IoT device which supports two HARQ processes. To this end, 1 bit within the DCI format may be utilized. For example, bit 0 may indicate one HARQ process while bit 1 may indicate two HARQ processes.

If two HARQ processes are indicated independently through two DCIs, the corresponding 1-bit indication may be applied to both of the two DCIs. If the bit is utilized, an NB-IoT device's missing of one DCI may be known. Therefore, an NB-IoT device may inform the base station through ACK/NACK signaling that it has missed one DCI. In other words, if information of bit 1 is determined to indicate two HARQ processes, and an NB-IoT device detects only one DCI, the NB-IoT device may recognize that it has failed to detect the other DCI and request re-transmission through ACK/NACK signaling.

When the method described above is used, and the ordering of DCI is predefined, an NB-IoT device may recognize which DCI has failed detection. For example, if the positions of NPDCCH #1 and NPDCCH #2 are predetermined, an NB-IoT device may recognize which NPDCCH has failed to be detected and may selectively transmit an ACK/NACK signal for the detection.

The base station may configure an NB-IoT device by using RRC signaling to run two HARQ processes or to run only one HARQ process. At this time, if the number of DCI (DCI for NPDSCH scheduling or NPUSCH scheduling) information bits for the case where the NB-IoT device is configured to run two HARQ processes differs from the number of DCI information bits for the case where the NB-IoT device is configured to run one HARQ process, there may be a discrepancy in understanding the number of DCI information bits between the NB-IoT device and the base station during a process for configuring execution of two HARQ processes and execution of one HARQ process. To avoid the discrepancy, the number of DCI information bits may be made to be the same for both cases where execution of two HARQ processes is configured and where execution of one HARQ process is configured. At this time, when execution of two HARQ processes is configured, and 1 bit HARQ process ID information is used, if execution of one HARQ process is configured, the corresponding 1 bit at the same position within the DCI information bit stream may be used for another use. As a specific example, if the maximum data size (for example, Transport Block Size (TBS)) supported for operating one HARQ process is larger than the maximum data size (for example, TB) supported for operating two HARQ processes, the corresponding 1 bit may be used for extending a field which informs of data size.

If two search spaces are configured to support two HARQ processes, the DCI of an NPDCCH included in the first search space may include information about two NPDSCHs, and the DCI of an NPDCCH included in the second search space may include information about only one NPDSCH (or NPUSCH). In this case, an NB-IoT device may process both of the two NPDSCHs (or NPUSCHs) when an NPDCCH including all of the information about the two NPDSCHs (or NPUSCHs) is decoded while, if an NPDCCH including information about only one NPDSCH (or NPUSCH) is decoded, the NB-IoT device may process only one NPDSCH (or NPUSCH). In this case, when the NB-IoT device decodes one NPDCCH, the NB-IoT device may not perform an operation for decoding a further NPDCCH. For example, the DCI included in the second NPDCCH may include information about the second NPDSCH (or NPUSCH) only. This may be intended to improve average throughput by adding usability of the second NPDSCH (or NPUSCH) even if decoding of the first NPDCCH fails. Instead, to ensure preparation time required to process the NPDSCH (or NPUSCH) after decoding of the NPDCCCH, information for the first NPDSCH may not be transmitted.

When a method for configuring both of two NPDSCHs (or NPUSCHs) by using one DCI to support two HARQ processes is used, the same NPDCCH may be transmitted repeatedly one or more times. This may be intended to increase the performance gain of the two HARQ processes by increasing the opportunity for an NB-IoT device to receive an NPDSCH or to attempt decoding before transmission of an NPUSCH. On the other hand, in the case of an NB-IoT device, the number of available NPDSCHs (or NPUSCHs) may differ depending on the time at which the NPDCCH is decoded. For example, if the first NPDSCH is received when the NPDCCH is decoded or time for transmitting the first NPUSCH is not enough, an NB-IoT device may give up the operation for the corresponding NPDSCH (or NPUSCH) and perform the operation for processing the second NPDSCH (or NPUSCH) immediately.

F. Fifth Disclosure: Collision Handling

When a scheduling delay offset that may be expressed through DCI is not sufficient while two HARQ processes are supported, the positions at which two NDPSCUs or two NPUSCHs are generated may collide with each other. For example, this collision may be described as follows with reference to FIG. 12.

Figure 12B:
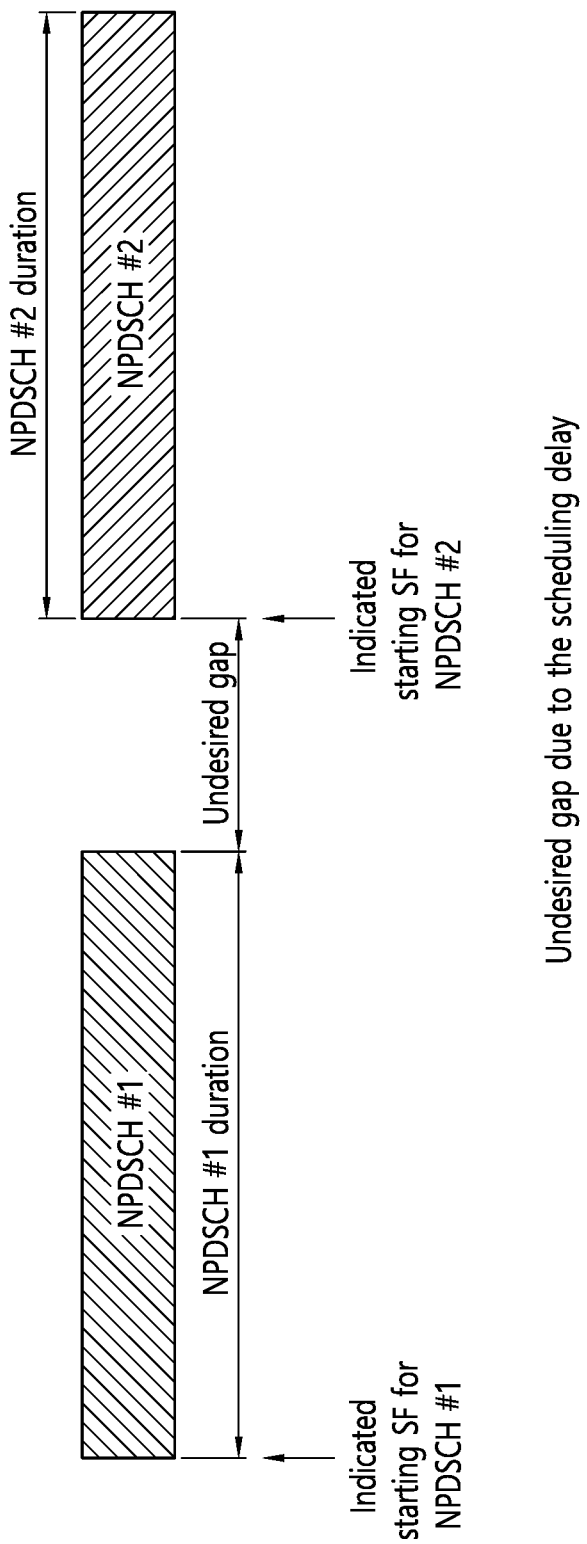
FIG. 12b illustrates an example in which a time gap between two NPDSCHs is excessively large.
Figure 12C:
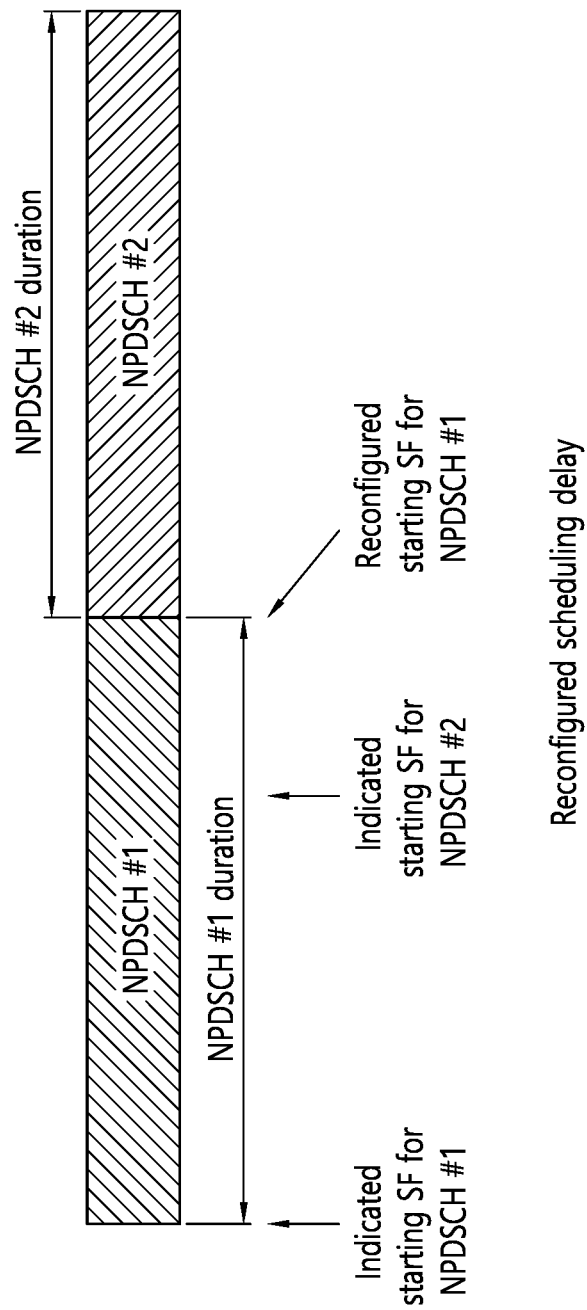
FIG. 12c illustrates an example in which two NPDSCHs are disposed contiguously.

FIG. 12*a* illustrates an example in which two NPDSCHs collide with each other, FIG. 12*b* illustrates an example in which a time gap between two NPDSCHs is excessively large, and FIG. 12*c* illustrates an example in which two NPDSCHs are disposed contiguously.

As may be known from FIG. 12*a*, while transmission of the first NPDSCH is not completed yet, the starting subframe of the second NPDSCH may be positioned. This may be so because the scheduling delay offset that may be expressed through DCI is not sufficient. This may be so because a combination of available scheduling delay offsets is determined only to collide with each other.

As seen with reference to FIG. 12*b*, although a scheduling delay offset may be available, the size of a gap formed between two NPDSCHs or two NPUSCHs may be too large.

To reduce the size of a gap which is unnecessarily large, the collision may be forced to be generated as shown in FIG. 12*a*.

As shown in FIG. 12*c*, to reduce the size of a gap which is unnecessarily large, two NDPSCHs may be disposed contiguously.

F-1. Reconfiguration of Scheduling Time Delay for the Second NPDSCH (or Second NPUSCH)

The present section proposes a method for avoiding collision by adjusting the position of the second NPDSCH or NPUSCH to the position where the first NPDSCH or NPUSCH ends when collision is occurred. A base station may determine a scheduling delay offset suitable for the characteristics of an NB-IoT device and payload and inform the NB-IoT device of the determined scheduling delay offset through DCI. The NB-IoT device checks the scheduling delay offset through the received DCI. If no collision is expected, the NB-IoT device prepares for reception by directly applying the configured scheduling delay offset. However, if collision occurs even if the scheduling delay offset is applied, the NB-IoT device may ignore the scheduling delay offset for the second NPDSCH (or NPUSCH) and expect a starting subframe of the second NPDSCH (or NPUSCH) after a predetermined timing offset with respect to the ending time in accordance with the timing at which transmission of the first NPDSCH or NPUSCH is completed. FIG. 12c illustrates the method described above.

The proposed method may configure the gap between two NPDSCHs or NPUSCHs to have a predetermined size. This may be intended to compensate for the case where only the scheduling delay for a gap larger than the gap which may be processed by an NB-IoT device is allowed. For example, if the scheduling delay configurable through DCI is N, and the time delay required for processing by an NB-IoT device is M which is smaller than N, the base station and NB-IoT device may assume a gap of M to transmit and receive signals. At this time, the size of a gap which may be processed by an NB-IoT device may be fixed to a predefined value. This value may differ according to the payload of each NPDSCH or NPUSCH; and the size of an actual gap corresponding to the size of each NPDSCH may be formulated in the form of a table for further use. The base station and NB-IoT device may select the size of a gap to be used through the payload size and scheduling delay offset by referring to the same table. Or the gap size may be reduced as proposed only when the NB-IoT device informs the base station of its category and capability in advance, and the corresponding category or capability is suitable. When the proposed method is used, an advantage is obtained that a gap size may be configured more flexibly without increasing the size of DCI which indicates a scheduling delay offset.

As another method which may be applied to the case where two NPDSCHs or NPUSCHs collide with each other, one NPDSCH or NPUSCH may be dropped.

F-2. Restriction on Scheduling Delay

The present section proposes a method for avoiding collision by restricting a time delay available for two HARQ processes. If a scheduling delay when two HARQ processes are supported is limited to the scheduling delay defined in the existing Rel-13 specification, part of the scheduling delay may cause collision between two NPDSCHs (or NPUSCHs). For example, if the total number of subframes used for an NPDSCH exceeds the number of subframes that may be expressed by a scheduling delay, collision may occur. At this time, the number of subframes used for the NPDSCH may be determined by the number of repetitions ($N_{Rep}$) and the number of allocated subframes ($N_{SF}$). Therefore, to prevent a collision situation, sizes of $N_{Rep}$ and $N_{SF}$ that may be used for two HARQ processes may be restricted.

FIGS. 13a to 13c illustrate examples of combinations of the number of repetitions ($N_{Rep}$) and the number of subframes ($N_{SF}$) by which two HARQ processes may be supported without involving collision among NPDSCHs in the form of tables.

In the tables shown, the horizontal axis represents $N_{Rep}$, and the vertical axis represents $N_{SF}$, where the number in each column denotes the number of subframes N which is expressed as a combination of $N_{Rep}$ and $N_{SF}$. The table of FIG. 13a shows all possible combinations for all $R_{max}$ values. The table of FIG. 13b shows all possible combinations when only the scheduling delay for $R_{max}$<128 is supported by two HARQ processes. The table of FIG. 13c shows one example of all possible combinations of $N_{Rep}$ and $N_{SF}$ when only the scheduling delay for $R_{max}$<128 is supported by two HARQ processes.

As another example, if the total number of subframes used for an NPUSCH exceeds the number of subframes that may be expressed by the scheduling delay offset, collision may occur. At this time, the number of subframes used for the NPUSCH may be determined by $N_{Rep}$, $N_{RU}$, and $N_{slot}^{UL}$. Therefore, to prevent a collision situation, sizes of $N_{Rep}$ and $N_{RU}$ available for two HARQ processes may be restricted differently according to $N_{slot}^{UL}$.

FIGS. 14a to 14d illustrate examples of combinations of the number of repetitions ($N_{Rep}$) and the number of resource units ($N_{RU}$) by which two HARQ processes may be supported without involving collision among NPUSCHs in the form of tables according to the respective slot values ($N_{slot}^{UL}$).

Since NPUSCH transmission based on 3.75 kHz may not be expressed by using an offset value of the scheduling delay as defined in the current specification, it is not possible to support two HARQ processes. As seen from the tables of FIGS. 14a to 14d, the larger the number of subcarriers used in an NPUSCH (or the smaller the value of $N_{slot}^{UL}$), the larger the combination of $N_{Rep}$ and $N_{RU}$ available for NPUSCH transmission. By taking into account this fact, the size of $N_{slot}^{UL}$ used for two HARQ processes may be restricted. For example, two HARQ processes may be restricted to such a case where $N_{slot}^{UL} \geq 4$.

F-3. Method for Puncturing One of NPDSCHs (or NPUSCHs)

The present section proposes a method for puncturing one of NPUSCHs (or NPDSCHs) to prevent collision from being occurred between two NPDSCHs (or NPUSCHs) while two HARQ processes are supported. A base station may determine a scheduling delay offset suitable for the characteristics of an NB-IoT device and payload; and inform the NB-IoT device of the determined scheduling delay offset through DCI. The NB-IoT device checks the scheduling delay offset through the received DCI and if no collision issue due to the scheduling delay offset is found, receives a signal by applying the configured scheduling delay offset without a modification. If collision occurs due to the scheduling delay offset, one of NPDSCHs (or NPUSCHs) may be punctured.

For example, if two NPDSCHs collide with each other, a first NPDSCH may be punctured for the overlapping period. In this case, an NB-IoT device, if it has received both of the two NPDCCHs, may assume that the first NPDSCH has been punctured. At this time, even if the NB-IoT device fails to decode the first NPDCCH and fails to obtain scheduling information about the first NPDSCH, reception of the second NPDSCH may still proceed in the same way as before. In the opposite example, if two NPDSCHs collide with each other, the second NPDSCH may be punctured for the overlapping period. In this case, an NB-IoT device, if it has received both of the two NPDCCHs, may assume that the second NPDSCH has been punctured. At this time, even if the NB-IoT device fails to decode the second NPDCCH and fails to obtain scheduling information for the second NPDSCH, reception of the first NPDSCH may still proceed in the same way as before.

F-4. Extended Scheduling Delay Offset

The present section proposes a method for introducing an additional scheduling delay offset when collision occurs between two NPDSCHs (or NPUSCHs) while two HARQ processes are supported. When the scheduling delay offset specified through DCI is k, the proposed method may set the actually used scheduling delay offset to be $k+k_{offset}$. The object to which the scheduling delay offset is applied may be the entire NPDSCHs (or NPUSCHs) which perform two HARQ processes, or the scheduling delay offset may be applied only to a specific NPDSCH (or NPUSCH). For example, if the scheduling delay offset for the first NPDSCH specified through the first DCI is $k_1$, and the scheduling delay offset for the second NPDSCH specified through a different DCI is $k_2$, the actual scheduling delay offset for the second NPDSCH may be set to $k_2 \ k_{offset}$.

$k_{offset}$ which is an additional scheduling delay offset value proposed in the present section, may use a predetermined, fixed value or may be informed to an NB-IoT device through a higher layer parameter as in the RRC signaling. Similarly, $k_{offset}$ may be set by a function of $R_{max}$. For example, the $k_{offset}$ value when $R_{max}$>128 may be set differently from the $k_{offset}$ value when $R_{max}$>128.

The present section also proposes to distinguish the ordering of NPDSCHs to identify an NPDSCH to which $k_{offset}$, the additional scheduling delay offset, is applied. This is intended so that even when an NB-IoT device fails to decode an NPDCCH corresponding to the second NPDSCH, the scheduling delay offset of the second NPDSCH may always be applied in the same way as before. As one method for distinguishing the order of an NPDSCH, the HARQ process ID used in the process for transmitting an NPDCCH may be used. When the HARQ process ID with a length of 1 bit is included in the DCI, the value of bit 0 (or 1) may be determined to always express scheduling information about the second NPDSCH.

Also, to identify an NPDSCH to which $k_{offset}$, the additional scheduling delay offset, is applied, the present section proposes to use DCI. In other words, a 1-bit length indicator representing whether to apply $k_{offset}$ may be included in the field of each DCI transmitted through each NPDCCH. In this case, an NB-IoT device may determine whether to use $k_{offset}$ according to the indication by the indicator irrespective of the appearance order of the NPDCCH or HARQ process ID. The method described above brings an advantage that even if an NB-IoT device fails to decode one NPDCCH, the NB-IoT device may still calculate the scheduling delay offset of an NPDSCH which has been decoded successfully.

The method for applying $k_{offset}$ to the scheduling delay offset may be applied in the same way to a method for determining ACK/NACK transmission timing. For example, if $k_{offset}$ is applied to the scheduling delay offset of a specific NPDSCH, the same $k_{offset}$ may be applied to the ACK/NACK transmission timing resource associated with the specific NPDSCH.

G. Seventh Disclosure: NPDCCH Search Space Starting Subframe

When two HARQ processes are used, an NB-IoT device may have to monitor two NPDCCHs. In this case, a starting subframe for monitoring each NPDCCH needs to be defined. In what follows, methods for determining a starting subframe for monitoring two NPDCCHs are proposed.

G-1. Method for Using Existing Configuration for NPDCCHs

As one method for defining starting subframes of two NPDCCHs, the existing definition for an NPDCCH starting subframe may be reused so that an NB-IoT device may monitor two NPDCCHs through a definition for one starting subframe. In this case, an NB-IoT device may monitor two NPDCCHs by performing blind decoding at every period of T that determines a starting subframe. A starting subframe may be determined through the following mathematical equation.

$$(10n_f + \lfloor n_s/2 \rfloor) \bmod T = \alpha_{offset} \cdot T, \text{ where } T = R_{max} \cdot G \quad [\text{Eq. 1}]$$

If an NB-IoT device decodes one NPDCCH at a predetermined starting subframe position, the NB-IoT device may be made to decode an additional NPDCCH before the starting subframe of an NPDSCH (or NPUSCH) specified by the DCI included in the decoding NPDCCH is started. If the NB-IoT device finds both of the two NPDCCHs, the NB-IoT device may stop the blind decoding operation for searching for an additional NPDCCH.

The operation for searching for the second NPDCCH proposed in the present section may be performed only for an NB-IoT device capable of supporting two HARQ processes. This may be intended to reduce a burden due to the additional blind decoding operation on the NB-IoT devices capable of supporting only one HARQ process. Similarly, among NB-IoT devices capable of supporting two HARQ processes, only the NB-IoT device instructed by the base station to operate two HARQ processes may be made to perform the operation for searching for the second NPDCCH proposed in the present section. This is so intended as to reduce a burden due to the additional blind decoding operation on an NB-IoT device capable of supporting two HARQ processes but instructed by the base station to operate only one HARQ process.

The operation for searching for the second NPDCCH proposed in the present section may be determined according to the HARQ process ID. At this time, the order of assigning HARQ process IDs to two HARQ processes may be determined according to the order in which NPDCCHs appear. For example, the HARQ process ID expressed by the DCI included in the first NPDCCH of the two NPDCCHs may be set to have a value of 0, and the HARQ process ID expressed by the DCI included in the second NPDCCH may be set to have a value of 1. Also, when only one HARQ process is supported, the HARQ process ID may be set to have a value of 1. In this case, an NB-IoT device may perform monitoring for searching for an additional NPDCCH when the HARQ process ID is 0 while the NB-IoT device may not perform monitoring for searching for an additional NPDCCH when the HARQ process ID is 1. The method above provides an advantage that an NB-IoT device does not have to perform further blind decoding if the value of an HARQ process ID is identified as 1 through blinding decoding of an NPDCCH. Also, an additional advantage is obtained that the method may be applied without a format change even when an NB-IoT device capable of supporting two HARQ processes is made to operate one HARQ process. Also, a yet additional advantage is obtained that when an NB-IoT device capable of supporting two HARQ processes succeeds in decoding only the first NPDCCH but fails to decode the second NPDCCH, the method may recognize the situation. The HARQ process ID mentioned in the example above is a value introduced for the convenience of descriptions, and it should be clearly understood that the proposed method may provide the same effect even if the values of 0 and 1 are exchanged.

G-2. Method for Configuring NPDCCHs in Pairs

As one method for defining starting subframes for two NDPCCHs, the existing definition for an NPDCCH starting subframe may be reused to determine the position for monitoring the first NPDCCH and to determine the position of the second NPDCCH in association with the first NPDCCH. In this case, an NB-IoT device may monitor one NPDCCH by performing blind decoding at every period of T that determines a starting subframe. A starting subframe may be determined through the following mathematical equation.

$$(10n_f + \lfloor n_s/2 \rfloor) \bmod T = \alpha_{offset} \cdot T, \text{ where } T = R_{max} \cdot G \quad [\text{Eq. 2}]$$

When an NB-IoT device decodes an NPDCCH at the predetermined position of a starting subframe, it may be expected that the second NPDCCH follows the subframe separated by a predetermined value of $k_{offset}$ from the decoded NPDCCH. At this time, the value of $k_{offset}$ may be a predefined, fixed value or set through RRC signaling. Similarly, the value of $k_{offset}$ may be specified dynamically by the DCI included in the first NPDCCH.

The $k_{offset}$ value proposed in the present section may be applied periodically. For example, an NB-IoT device may be determined to monitor the second NPDSCH (or NPUSCH) at the subframe index corresponding to a multiple of $k_{offset}$ before the first NPDSCH (or NPUSCH) is started after the first NPDSCH is decoded by the NB-IoT device. If the NB-IoT device finds both of the two NPDCCHs, the blind decoding operation for searching for an additional NPDCCH may be stopped.

The operation for searching for the second NPDCCH proposed in the present section may be performed only to the NB-IoT devices capable of supporting two HARQ processes. This may be intended to reduce a burden due to the additional blind decoding operation on the NB-IoT devices capable of supporting only one HARQ process. Similarly, among NB-IoT devices capable of supporting two HARQ processes, only the NB-IoT device configured by the base station to operate two HARQ processes may be made to perform the operation for searching for the second NPDCCH proposed in the present section. This may be intended to reduce a burden due to the additional blind decoding operation on the NB-IoT devices configured by the base station to operate only one HARQ process.

Whether to operate two HARQ processes proposed in the present section may be determined by the HARQ process ID of a decoded NPDCCH. At this time, the order of assigning HARQ process IDs to two HARQ processes may be determined according to the order in which NPDCCHs appear. For example, the HARQ process ID expressed by the DCI included in the first NPDCCH of the two NPDCCHs may be set to have a value of 0, and the HARQ process ID expressed by the DCI included in the second NPDCCH may be set to have a value of 1. Also, when only one HARQ process is supported, the HARQ process ID may be set to have a value of 1. In this case, if the HARQ process ID obtained through the NPDCCH decoded by using the existing definition for an NPDCCH starting subframe is 0, an NB-IoT device may recognize that the current process is operating based on two HARQ processes. On the other hand, if the HARQ process ID obtained through the NPDCCH decoded by using the existing definition for an NPDCCH starting subframe is 1, an NB-IoT device may recognize that the current process is operating based on one HARQ process. At this time, the HARQ process ID mentioned in the example above is a value introduced for the convenience of descriptions, and it should be clearly understood that the proposed method may provide the same effect even if the values of 0 and 1 are exchanged.

If the method proposed in the present section is used, and the search space determined by Eq. 2 (hereinafter SS1) and the search space determined by using $k_{offset}$ (hereinafter SS2) collide with each other, an NB-IoT device may not monitor one of the search spaces. For example, if an NB-IoT device is configured so that SS1 and SS2 collide with each other, the NB-IoT device may monitor only SS1. As another method, an NB-IoT device may first monitor one search space and monitor the other search space only when decoding is successful. In this case, for example, after having succeeded in decoding by monitoring the SS1 first, the NB-IoT device may monitor the SS2.

G-3. Method for Configuring Starting Frame of NPDCCH Independently by Higher Layer Signaling As one method for defining starting subframes for two NPDCCHs, a definition of the NPDCCH starting subframe for each NPDCCH may be configured independently through higher layer signaling, for example, through an RRC parameter. In this case, an NB-IoT device is given a period T and $\alpha_{offset}$ which determine a starting subframe and may be determined to monitor two NPDCCHs by performing blind decoding at each position corresponding to the period T and $\alpha_{offset}$. The starting subframe may be determined through the following mathematical equation.

$$(10n_f + \lfloor n_s/2 \rfloor) \bmod T = \alpha_{offset} \cdot T, \text{ where } T = R_{max} \cdot G \quad [\text{Eq. 3}]$$

At this time, $\alpha_{offset}$ and T value may be configured differently for each NPDCCH. If an NB-IoT device decodes one NPDCCH at the position of one starting subframe, the NB-IoT device may be determined to decode an additional NPDCCH at the position of a starting subframe corresponding to the remaining $\alpha_{offset}$ and T value before the starting subframe of an NPDSCH (or NPUSCH) specified by the DCI included in the decoded NPDCCH is started. If the NB-IoT device finds both of the two NPDCCHs, the blind decoding operation for searching for an additional NPDCCH may be stopped.

If the parameter of higher layer signaling configures the starting subframes for two NPDCCHs to be the same, an NB-IoT device may determine that the following process is based on one HARQ process.

The operation for searching for the second NPDCCH proposed in the present section may be performed only for an NB-IoT device capable of supporting two HARQ processes. This may be intended to reduce a burden due to the additional blind decoding operation on the NB-IoT devices capable of supporting only one HARQ process. Similarly, among NB-IoT devices capable of supporting two HARQ processes, only the NB-IoT device configured by the base station to operate two HARQ processes may be made to perform the operation for searching for the second NPDCCH proposed in the present section. This is so intended as to reduce a burden due to the additional blind decoding operation on an NB-IoT device capable of supporting two HARQ processes but instructed by the base station to operate only one HARQ process.

H. Eighth Disclosure: Search Space Configuration

An NB-IoT device supporting two HARQ processes may be configured to determine whether to apply the two HARQ processes during an RRC configuration process; and may be configured to expect an operation corresponding to one HARQ process in a common search space (CSS) and an operation corresponding to two HARQ processes in a user search space (USS). For the case of CSS, this may be intended to expect the same operation as done in the legacy UE without involving a separate DCI format nor extending search space configuration. Meanwhile, when an NB-IoT device is configured to operate two HARQ processes through RRC signaling, the NB-IoT device may monitor a search space only for two HARQ processes. This is intended to reduce a burden due to monitoring both of a search space for one HARQ process and a search space for two HARQ processes.

The embodiments of the present invention described so far may be implemented by various means. For example, embodiments of the present invention may be implemented by hardware, firmware, software, or a combination thereof. Specific implementation will be described with reference to the appended drawing.

Figure 15:
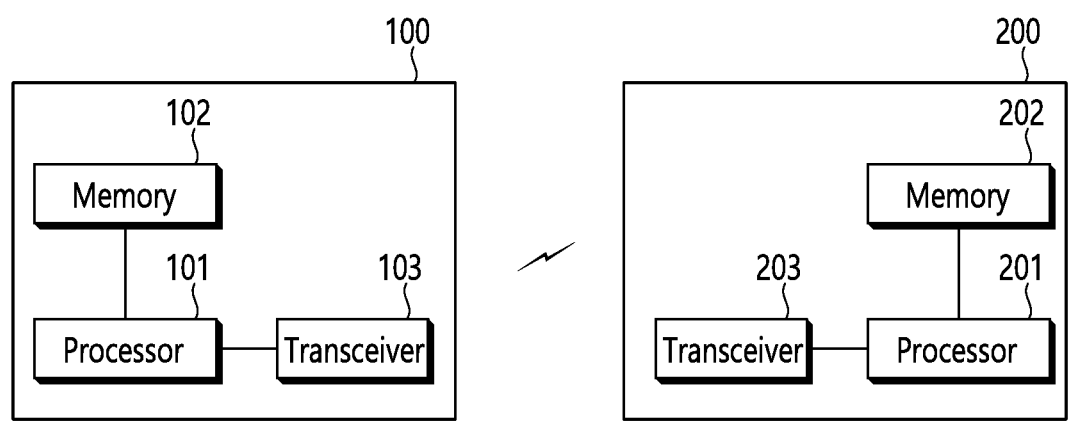
FIG. 15 is a block diagram illustrating a wireless communication system in which a disclosure of the present specification is implemented.

FIG. 15 is a block diagram illustrating a wireless communication system in which a disclosure of the present specification is implemented.

The base station 200 comprises a processor 201, memory 202, and transceiver (or radio frequency (RF) unit) 203. The memory 202, being connected to the processor 201, stores various kinds of information to operate the processor 201. The transceiver (or RF unit) 203, being connected to the processor 201, transmits and/or receives a radio signal. The processor 201 implements the functions, processes and/or methods. In the embodiments described above, the operation of the base station may be implemented by the processor 201.

The wireless device (for example, NB-IoT device) 100 comprises a processor 101, memory 102, and transceiver (or RF unit) 103. The memory 102, being connected to the processor 101, stores various kinds of information to operate the processor 101. The transceiver (or RF unit) 103, being connected to the processor 101, transmits and/or receives a radio signal. The processor 101 implements the functions, processes and/or methods.

The processor may include Application-Specific Integrated Circuit (ASIC), other chipset, logical circuit and/or data processing device. The memory may include Read-Only Memory (ROM), Random Access Memory (RAM), flash memory, memory card, storage medium and/or other storage device. The RF unit may include a baseband circuit for processing a radio signal. When an embodiment is implemented by software, the aforementioned method may be implemented by a module (process or function) which performs the aforementioned function. The module may be stored in the memory and executed by the processor. The memory may be installed inside or outside the processor and may be connected to the processor via various well-known means.

In the exemplary system described above, methods are described according to a flow diagram by using a series of steps and blocks. However, the present invention is not limited to a specific order of the steps, and some steps may be performed with different steps and in a different order from those described above or simultaneously. Also, it should be understood by those skilled in the art that the steps shown in the flow diagram are not exclusive, other steps may be further included, or one or more steps of the flow diagram may be deleted without influencing the technical scope of the present invention.

What is claimed is:

1. A method for transmitting a Hybrid Automatic Repeat reQuest (HARQ) ACK/NACK signal for Narrowband Internet of Things (NB-IoT) communication, the method comprising:
performing modulation of one or both of a first and second HARQ ACK/NACK signals, wherein the first HARQ ACK/NACK signal is generated by a first HARQ process and the second HARQ ACK/NACK signal is generated by a second HARQ process,
wherein the performing modulation comprises mapping one or both of the first and second HARQ ACK/NACK signals to a constellation in the form of Quadrature Phase Shift Keying (QPSK); and
wherein the first HARQ ACK/NACK signal is a signal generated by the first HARQ process based on first downlink data received on a first Narrowband Physical Downlink Shared Channel (NPDSCH), and
wherein the second HARQ ACK/NACK signal is a signal generated by the second HARQ process based on second downlink data received on a second NPDSCH.

2. The method of claim 1,
wherein mapping to the QPSK constellation is performed so that both of an I and Q signal of the QPSK constellation change their sign when the second HARQ ACK/NACK signal changes from ACK to NACK or from NACK to ACK, and
wherein only one of the I or Q signal changes its sign when the first HARQ ACK/NACK signal changes from ACK to NACK or from NACK to ACK.

3. The method of claim 1, wherein the first NPDSCH is scheduled by a first Narrowband Physical Downlink Control Channel (NPDCCH), and the second NPDSCH is scheduled by a second NPDCCH.

4. The method of claim 3,
wherein a subframe in which the first NPDSCH is receive is separated by a first offset (k1) from a subframe in which receiving of the first NPDCCH is terminated, and
wherein a subframe in which the second NPDSCH is received is separated by a second offset (k2) from a subframe in which receiving of the second NPDCCH is terminated.

5. The method of claim 4, wherein, after the first and second NPDCCHs are received, the first and second NPDSCHs are received.

6. The method of claim 4, wherein the first offset (k1) and the second offset (k2) are configured so that the subframe in which the first NPDCCH is received does not overlap the subframe in which the second NPDCCH is received.

7. The method of claim 6, wherein the additional offset is determined through higher layer signaling.

8. The method of claim 4, if it is determined by checking the first offset (k1) and the second offset (k2) that the subframe in which the first NPDCCH is received overlaps the subframe in which the second NPDCCH is received, further comprising assuming that the second NPDSCH is received at the time determined by adding an additional offset ($k_{offset}$) to the second offset (k2).

9. The method of claim 1, wherein the performing modulation further comprises:
mapping a second HARQ ACK/NACK signal to a constellation in the form of Binary Phase Shift Keying (BPSK); and
performing phase rotation according to a first HARQ ACK/NACK signal.

10. The method of claim 1, wherein, when the second downlink data cannot be decoded, mapping to the QPSK constellation is performed so that the sign of Q of the QPSK constellation based on whether the first ACK/NACK signal is ACK or NACK based on the first downlink data.

11. The method of claim 10, wherein the sign of I of the QPSK constellation is also changed according to whether the first ACK/NACK signal is an ACK or NACK based on the first downlink data.

12. A Narrowband Internet of Things (NB-IoT) device transmitting a Hybrid Automatic Repeat reQuest (HARQ) ACK/NACK signal, the NB-IoT device comprising:
a transceiver; and
a processor performing modulation of one or both of a first and second HARQ ACK/NACK signals, wherein the first HARQ ACK/NACK signal is generated by a first HARQ process and the second HARQ ACK/NACK signal is generated by a second HARQ process,
wherein the modulation comprises mapping one or both of the first and second HARQ ACK/NACK signals to a constellation in the form of Quadrature Phase Shift Keying (QPSK); and wherein the first HARQ ACK/NACK signal is a signal generated by the first HARQ process based on first downlink data received on a first Narrowband Physical Downlink Shared Channel (NPDSCH), and wherein the second HARQ ACK/NACK signal is a signal generated by the second HARQ process based on second downlink data received on a second NPDSCH.

13. The NB-IoT device of claim 12, wherein mapping to the QPSK constellation is performed so that both of an I and Q signal of the QPSK constellation change their sign when the second HARQ ACK/NACK signal changes from ACK to NACK or from NACK to ACK, and wherein only one of the I or Q signal changes its sign when the first HARQ ACK/NACK signal changes from ACK to NACK or from NACK to ACK.

14. The NB-IoT device of claim 12, wherein the first NPDSCH is scheduled by a first Narrowband Physical Downlink Control Channel (NPDCCH), and the second NPDSCH is scheduled by a second NPDCCH.

15. The NB-IoT device of claim 14, wherein a subframe in which the first NPDSCH is received is separated by a first offset (k1) from a subframe in which receiving of the first NPDCCH is terminated, and wherein a subframe in which the second NPDSCH is received is separated by a second offset (k2) from a subframe in which receiving of the second NPDCCH is terminated.

16. The NB-IoT device of claim 15, wherein the first offset (k1) and the second offset (k2) are configured so that the subframe in which the first NPDCCH is received does not overlap the subframe in which the second NPDCCH is received.

17. The NB-IoT device of claim 15, wherein, if it is determined by checking the first offset (k1) and the second offset (k2) that the subframe in which the first NPDCCH is received overlaps the subframe in which the second NPDCCH is received, the processor is configured to assume that the second NPDSCH is received at the time determined by adding an additional offset ($k_{offset}$) to the second offset (k2).

* * * * *